US010054795B2

(12) United States Patent
Mukawa

(10) Patent No.: US 10,054,795 B2
(45) Date of Patent: Aug. 21, 2018

(54) IMAGE DISPLAY APPARATUS AND HEAD MOUNTED DISPLAY

(71) Applicant: Sony Corporation, Tokyo (JP)

(72) Inventor: Hiroshi Mukawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 218 days.

(21) Appl. No.: 15/221,876

(22) Filed: Jul. 28, 2016

(65) Prior Publication Data
US 2016/0334629 A1 Nov. 17, 2016

Related U.S. Application Data

(63) Continuation of application No. 14/539,227, filed on Nov. 12, 2014, now Pat. No. 9,454,009, which is a (Continued)

(30) Foreign Application Priority Data

Aug. 31, 2009 (JP) ................................. 2009-199567
Dec. 10, 2009 (JP) ................................. 2009-280133

(51) Int. Cl.
*G02B 27/01* (2006.01)
*F21V 8/00* (2006.01)
*G02B 6/00* (2006.01)

(52) U.S. Cl.
CPC ....... *G02B 27/0176* (2013.01); *G02B 6/0018* (2013.01); *G02B 6/0035* (2013.01); (Continued)

(58) Field of Classification Search
CPC .............. G02B 27/017; G02B 27/0172; G02B 27/0176; G02B 2027/0178; (Continued)

(56) References Cited

U.S. PATENT DOCUMENTS 7,936,519 B2   5/2011  Mukawa et al.
7,944,616 B2 * 5/2011  Mukawa ............ G02B 27/0176
                                                      359/630
(Continued)

FOREIGN PATENT DOCUMENTS

EP      2 065 750 A2   6/2009
JP      2005-521099    7/2005
(Continued)

OTHER PUBLICATIONS

Korean Office Action dated Aug. 3, 2016 for corresponding Korean Application No. 10-2010-0079221.
(Continued)

*Primary Examiner* — Joseph P Martinez
(74) *Attorney, Agent, or Firm* — Michael Best & Friedrich LLP

(57) ABSTRACT

An image display apparatus includes: an image forming device; an optical system converting light emitted from the image forming device into parallel light; and an optical device to which the light beams converted into the parallel light by the optical system enter, in which the light beams are guided, and from which the light beams are emitted, wherein a central light beam emitted from the center of the image forming device, passing through the nodal point of the optical system and entering the optical device at an optical device center point intersects an XY plane defined by an X axis that passes through the optical device center point, and is parallel to the axis direction of the optical device and a Y axis that passes through the optical device center point, and coincides with the normal axis of the optical device at angles other than 0 degree.

14 Claims, 14 Drawing Sheets

Related U.S. Application Data continuation of application No. 13/966,802, filed on Aug. 14, 2013, now Pat. No. 8,912,981, which is a continuation of application No. 12/805,637, filed on Aug. 11, 2010, now Pat. No. 8,570,244.

(52) U.S. Cl.
CPC ....... *G02B 27/017* (2013.01); *G02B 27/0172* (2013.01); *G02B 6/00* (2013.01); *G02B 2027/0123* (2013.01); *G02B 2027/0125* (2013.01); *G02B 2027/0154* (2013.01); *G02B 2027/0159* (2013.01); *G02B 2027/0161* (2013.01); *G02B 2027/0178* (2013.01)

(58) Field of Classification Search
CPC .... G02B 2027/0123; G02B 2027/0154; G02B 2027/0161; G02B 6/08
See application file for complete search history.

(56) References Cited

U.S. PATENT DOCUMENTS

| | | |
|---|---|---|
| 8,570,244 B2 | 10/2013 | Mukawa |
| 8,912,981 B2 | 12/2014 | Mukawa |
| 2002/0113754 A1 | 8/2002 | Nakanishi |
| 2005/0180687 A1 | 8/2005 | Amitai |
| 2007/0008624 A1 | 1/2007 | Hirayama |
| 2007/0070504 A1 | 3/2007 | Akutsu et al. |
| 2007/0070859 A1 | 3/2007 | Hirayama |
| 2007/0091447 A1 | 4/2007 | Inoguchi |
| 2007/0217017 A1 | 9/2007 | Ichikawa |
| 2013/0328748 A1 | 12/2013 | Mukawa |

FOREIGN PATENT DOCUMENTS

| | | |
|---|---|---|
| JP | 2005-318173 A | 11/2005 |
| JP | 2006-162767 | 6/2006 |
| JP | 2007-094175 | 4/2007 |
| JP | 2008-268873 A | 11/2008 |
| JP | 2009-133999 A | 6/2009 |
| JP | 2011-053267 A | 3/2011 |
| JP | 2011-053468 A | 3/2011 |
| WO | WO-2004/109349 A2 | 12/2004 |
| WO | WO-2009/037706 A1 | 3/2009 |

OTHER PUBLICATIONS

Partial European Search Report dated Dec. 22, 2017 for corresponding European Application No. 16188898.7.
Extended European Search Report dated Mar. 13, 2017 for corresponding European Application No. 16188898.7.
Partial European Search Report (R. 64 EPC) dated Nov. 22, 2010 for corresponding European Application No. 10 00 8392.
Japanese Office Action dated Mar. 26, 2013 for corresponding Japanese Application No. 2009-280133.
European Patent Office Communication Pursuant to Article 94(3) EPC dated Jun. 19, 2013 for corresponding 10 008 392.2.
Korean Office Action dated Mar. 7, 2016 for corresponding Korean Application No. 10-2010-0079221.

* cited by examiner

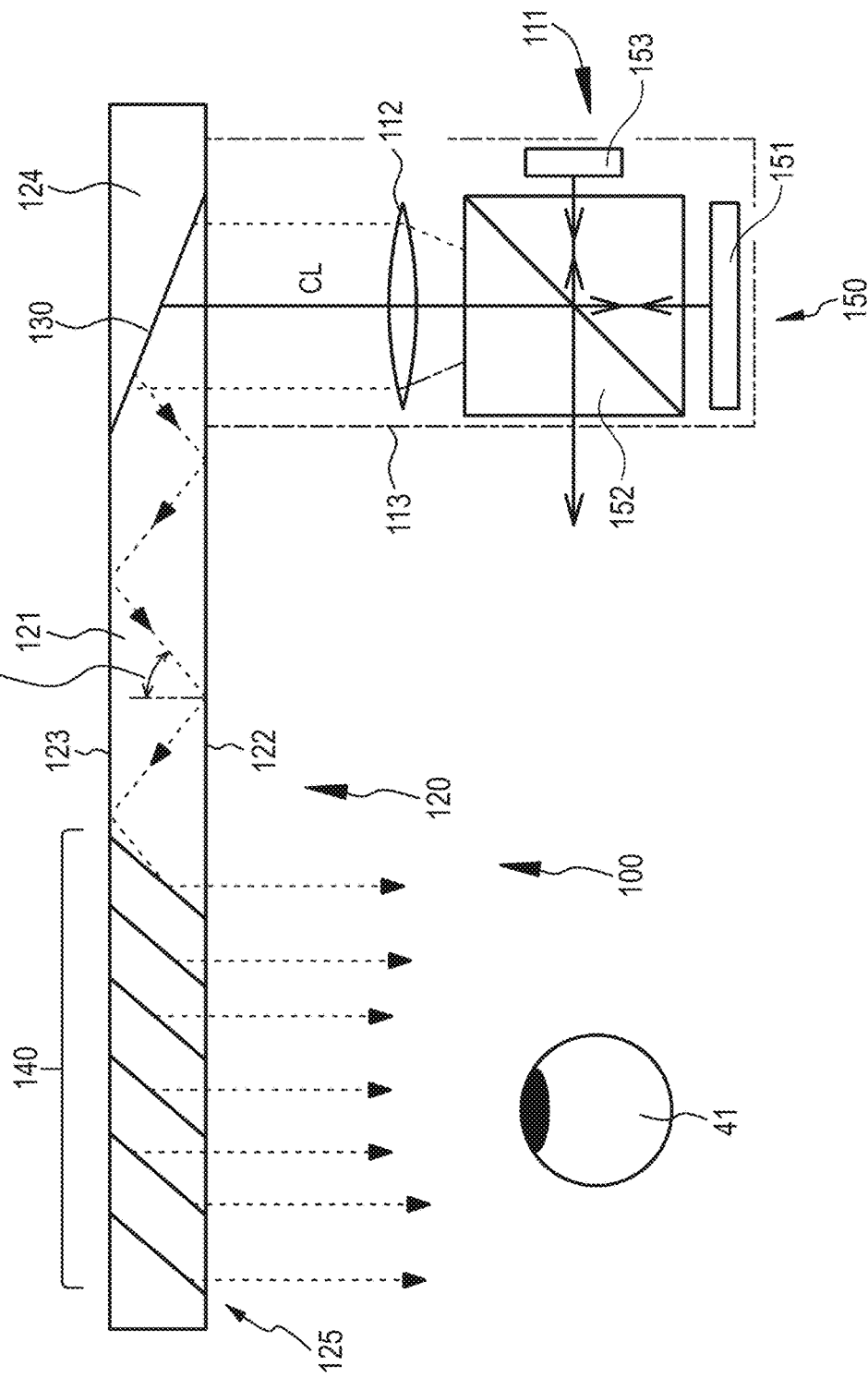

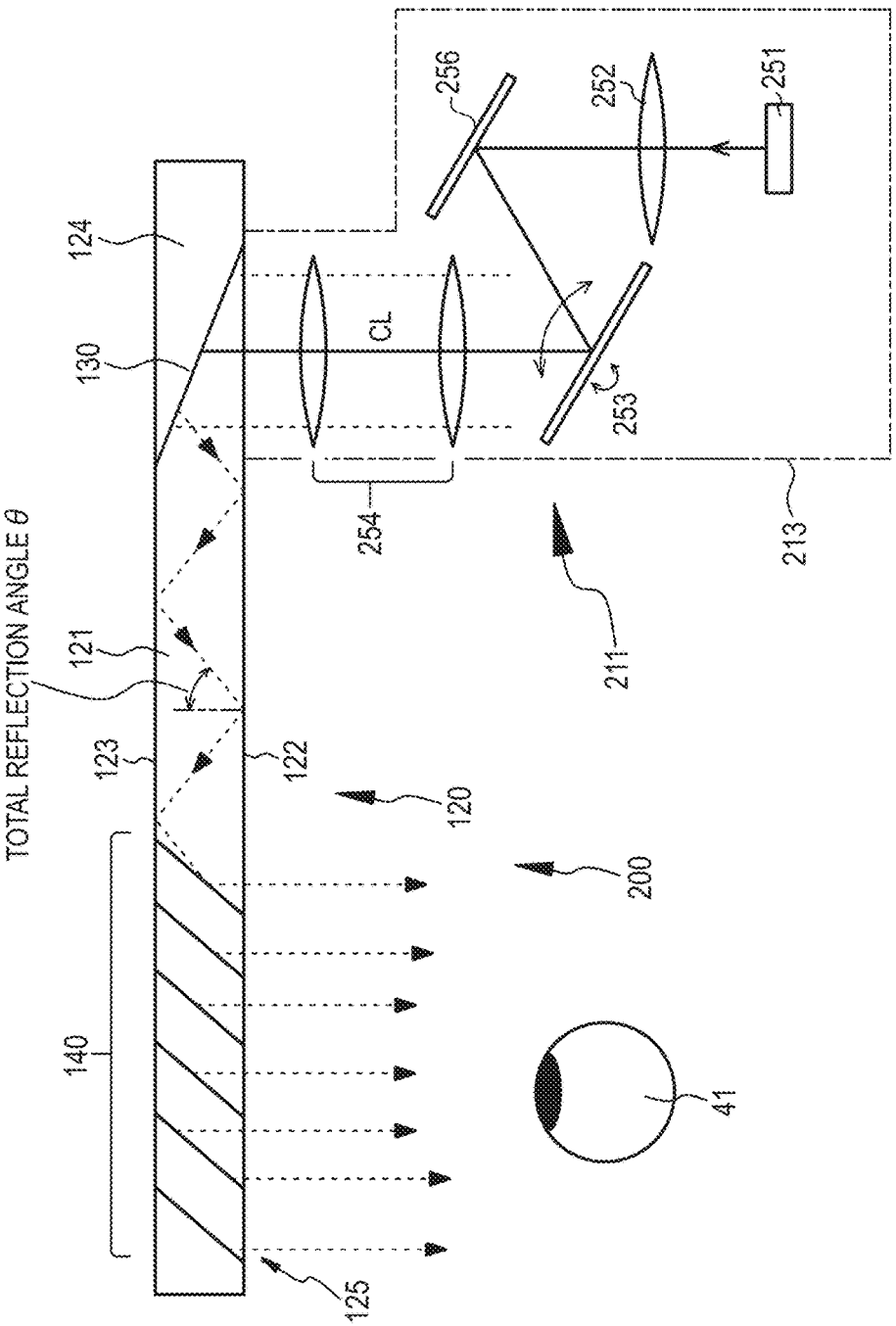
FIG.5 (EMBODIMENT 2)

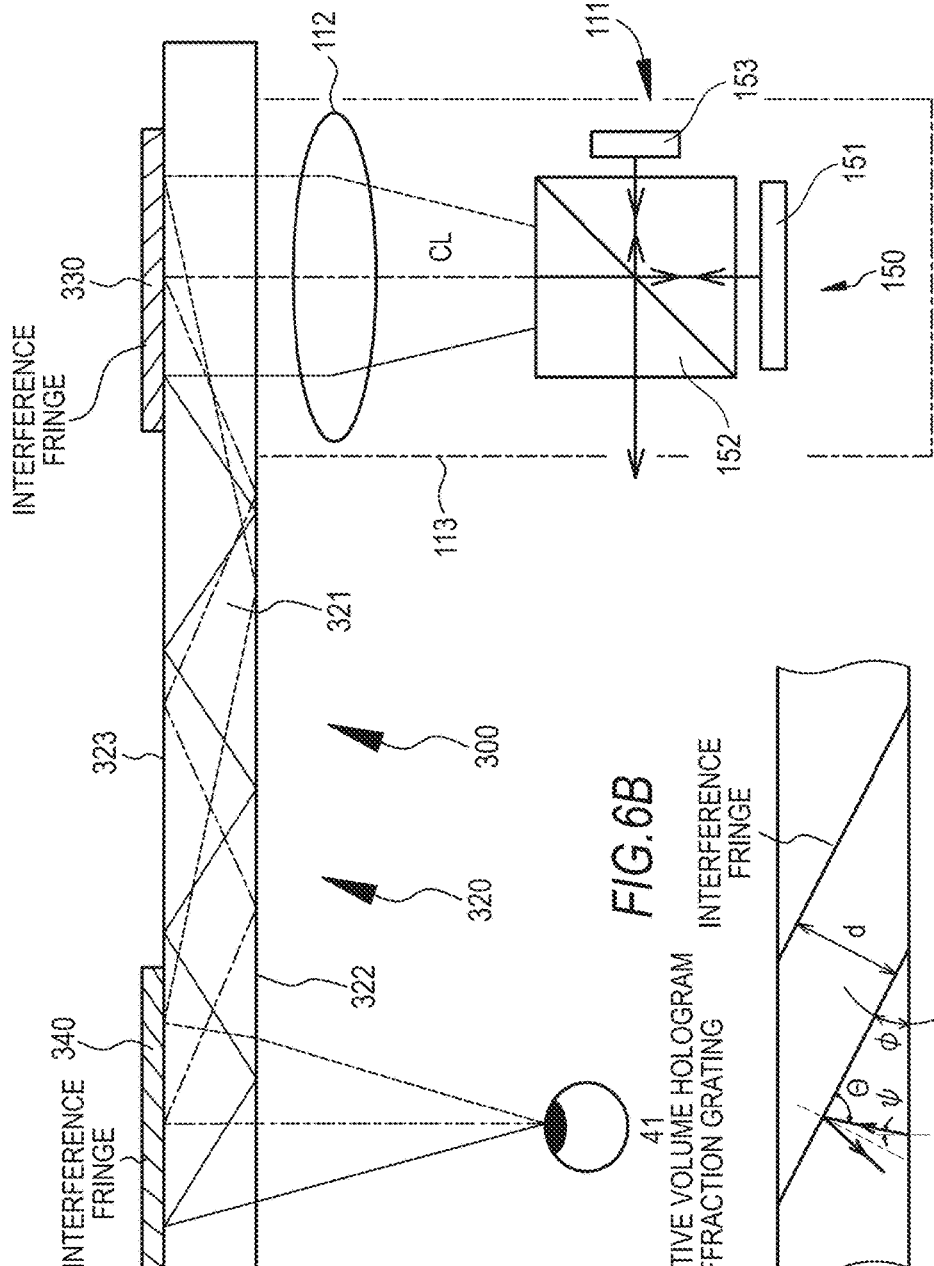

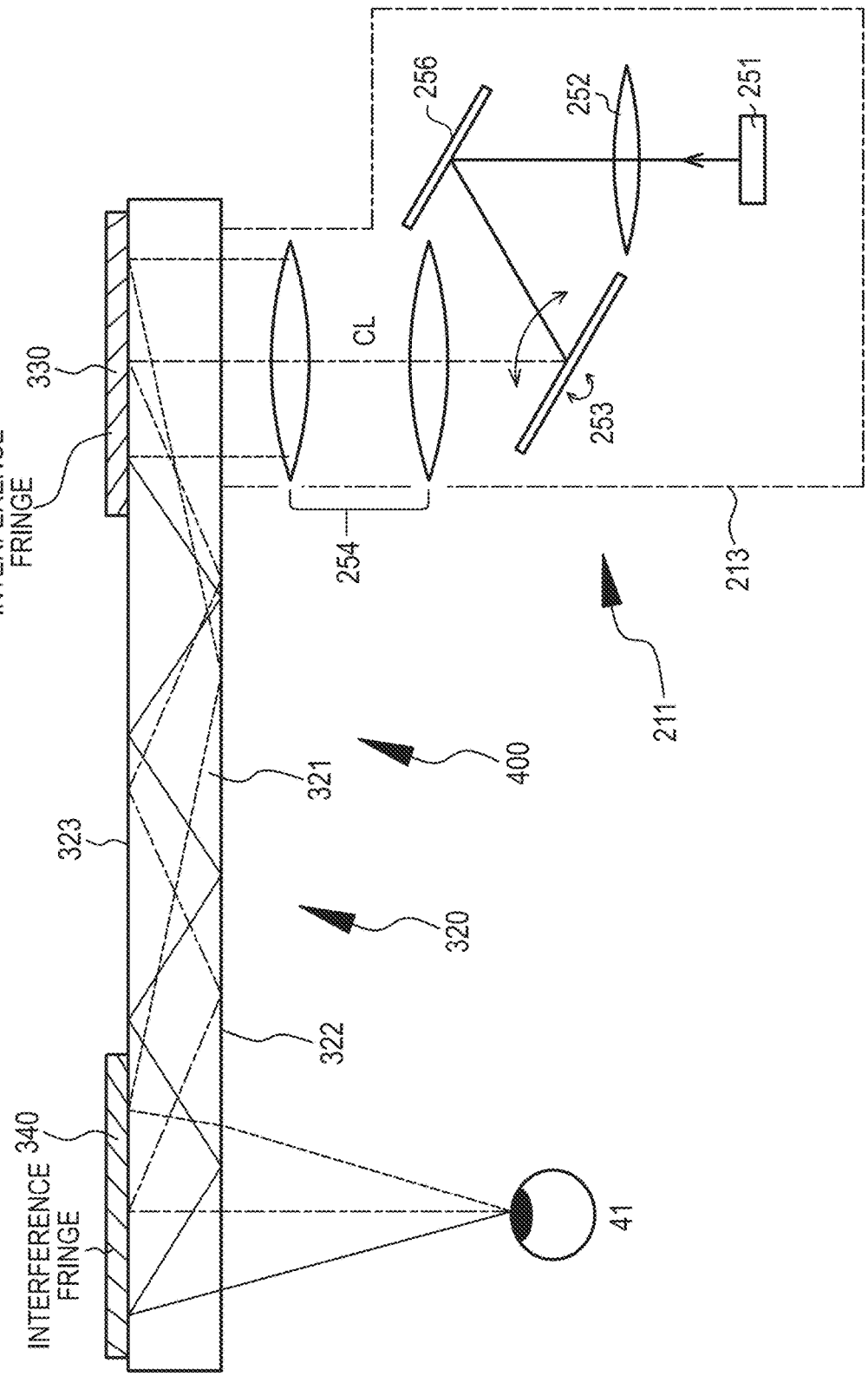

IMAGE DISPLAY APPARATUS AND HEAD MOUNTED DISPLAY

This is a Continuation Application of U.S. patent application Ser. No. 14/539,227 filed Nov. 12, 2014, which is a Continuation Application of U.S. patent application Ser. No. 13/966,802 filed Aug. 14, 2013, now U.S. Pat. No. 8,912,981, issued on Dec. 16, 2014, which is a Continuation Application of U.S. patent application Ser. No. 12/805,637 filed Aug. 11, 2010, now U.S. Pat. No. 8,570,244, issued on Oct. 29, 2013, which in turn claims priority from Japanese Application Nos.: JP 2009-199567 and JP 2009-280133 filed in the Japan Patent Office on Aug. 31, 2009 and Dec. 10, 2009, respectively, the entire contents of which is hereby incorporated by reference.

BACKGROUND OF THE INVENTION

1. Field of the Invention

The present invention relates to an image display apparatus used in order to allow an observer to observe a two-dimensional image formed by an image forming device, and relates to a head mounted display (HMD) having the image display apparatus incorporated therein and including a frame shaped like glasses to be worn on the head of an observer.

2. Description of the Related Art

A virtual-image display apparatus (image display apparatus) in which a virtual-image optical system allows an observer to view, as an enlarged virtual image, a two-dimensional image formed by an image forming device is widely known from JP-A-2006-162767.

As shown in FIG. 1 which is a conceptual view, an image display apparatus 100 includes an image forming device 111 having a plurality of pixels arrayed in a two-dimensional matrix, a collimating optical system 112 for collimating light emitted from the pixels of the image forming device 111, and an optical device (a light guide means) 120 on which the light collimated by the collimating optical system 112 is incident. The incident light is guided and emitted from the optical device. The optical device 120 includes a light guide plate 121, a first deflecting member 130 (e.g., a single-layer light reflective film), and a second deflecting member 140 (e.g., a light reflective multilayer film having a multilayer laminated structure). Incident light propagates in the light guide plate 121 by total reflection and is then emitted from the light guide plate 121. The first deflecting member 130 reflects the light incident on the light guide plate 121 so that light incident on the light guide plate 121 is totally reflected in the light guide plate 121, and the second deflecting member 140 emits the light, which propagates in the light guide plate 121 by total reflection, from the light guide plate 121. For example, if HMD is formed by such an image display apparatus 100, the reduction in weight and size of an apparatus can be achieved.

Further, a virtual-image display apparatus (image display apparatus) using a hologram diffraction grating, in which a virtual-image optical system allows an observer to view, as an enlarged virtual image, a two-dimensional image formed by an image forming device is widely known from JP-A-2007-94175.

As shown in FIG. 6 which is a conceptual view, an image display apparatus 300 basically includes an image forming device 111 for displaying an image, a collimating optical system 112, and an optical device (a light guide means) 320 on which the light displayed by the image forming device 111 is incident. Incident light is guided to an eye 41 of an observer. Here, the optical device 320 includes a light guide plate 321, and first and second diffraction grating members 330 and 340 provided on the light guide plate 321. Each of the first and second diffraction grating members 330 and 340 is formed by a reflective volume hologram diffraction grating. Light emitted from pixels in the image forming device 111 enters the collimating optical system 112, where the light is converted into parallel light, and the parallel light enters the light guide plate 321. The parallel light is incident on and is emitted from a first surface 322 of the light guide plate 321. On the other hand, the first and second diffraction grating members 330 and 340 are attached to a second surface 323 of the light guide plate 321 parallel to the first surface 322.

SUMMARY OF THE INVENTION

When an observer views a horizontally located object in a see-through type head mounted display, in order to prevent a display image from becoming an obstacle, it is necessary to shift and display the display image to above or below the line of sight of an observer in a horizontal direction (referred to a "horizontal line of sight of an observer"). In such a case, in the related art, the whole image display apparatus 100 or 300 is arranged, for example, below the horizontal line of sight of the observer (refer to FIG. 13). That is, the image forming device 111 is attached to temple portions of a frame shaped like glasses, using an attaching member, in order to be worn on the head of an observer.

Meanwhile, the image display apparatus 100 or 300 in the related art is designed so that a central light beam CL that is emitted from the center of the image forming device 111, and passes through the principal point (hereinafter may be referred to as a "front principal point") of the collimating optical system 112 on the side of the image forming device impinges on the light guide plate 121 or 321 perpendicularly. That is, the central light beam CL is designed to enter the light guide plate 121 or 321 at a zero incidence angle. In this case, the center of an image to be displayed coincides with a perpendicular direction of the first surface 122 or 322 of the light guide plate 121 or 321.

The basic configuration of the image display apparatus (represented by the image display apparatus 100) in the related art is shown in FIGS. 14A and 14B. The central light beam CL emitted from the center of the image forming device 111 on the optical axis of the collimating optical system 112 is converted into substantially parallel light by the collimating optical system 112, and then enters the first surface (incident surface) 122 of the light guide plate 121 perpendicularly. Then, the light travels along a propagation direction A while being totally reflected between the first surface 122 and the second surface 123 by the first deflecting member 130. Subsequently, the central light beam CL is reflected and diffracted by the second deflecting member 140, is emitted perpendicularly from the first surface 122 of the light guide plate 121, and reaches the eye 41 of an observer.

However, in such a related art, as shown in FIG. 13, it is necessary to tilt the whole image display apparatus 100 by an angle θ". Particularly when the size of the image display apparatus 100 is large, there is a problem in that the angle θ" by which the image display apparatus 100 can be tilted is limited or the degree of freedom in design becomes low, from the relationship with an attaching portion (a temple portion) of a frame shaped like glasses for being worn on the head of the observer.

Further, an observable region (pupil diameter) of the image display apparatus is typically as small as about 6 mm. Thus, when the image display apparatus is moved in the vertical direction by pivoting the image display apparatus, there is a risk that an image emitted from the image display apparatus may be moved away from the eyes of an observer if the axis of this pivoting is greatly shifted from a virtual straight line connecting the centers of two eyeballs of an observer who observes the image forming device.

Therefore, it is desirable to provide an image display apparatus allowing an arrangement with a high degree of freedom and having a high degree of freedom in design so as not to become an obstacle to a horizontal line of sight of an observer, and a head mounted display in which the image display apparatus is incorporated. It is also desirable to provide a head mounted display that prevents an image emitted from an image display apparatus from being moved away from the eyes of an observer, even when the image display apparatus is moved in a vertical direction by pivoting the image display apparatus.

According to one embodiment of the invention, there is provided an image display apparatus including:

(A) an image forming device;

(B) an optical system that converts light emitted from the image forming device into parallel light; and (C) an optical device to which the light beams converted into the parallel light by the optical system enter, in which the light beams are guided, and from which the light beams are emitted.

Here, when a point where a central light beam that is emitted from the center of the image forming device and passes through the nodal point of the optical system on the side of the image forming device enters the optical device is defined as an optical device center point, an axis that passes through the optical device center point, and is parallel to the axis direction of the optical device is defined as an X-axis, and an axis that passes through the optical device center point, and coincides with the normal axis of the optical device is defined as a Y-axis, the central light beam intersects the XY plane at angles other than 0 degree.

According to a first embodiment of the invention a head mounted display is a head mounted display including:

(a) a frame shaped like glasses to be worn on the head of the head of an observer, and (b) an image display apparatus attached to the frame. The image display apparatus is formed by the above image display apparatus. The head mounted display of the embodiment of invention may include one image display apparatus (one-eye type) or two image display apparatuses (both-eyes type) of the embodiment of the invention.

According to a second embodiment of the invention, there is a provided a head mounted display including:

(a) a frame shaped like glasses to be worn on the head of an observer; and (b) an image display apparatus attached to the frame, the image display apparatus including:

(A) an image forming device;

(B) an optical system that converts light emitted from the image forming device into parallel light; and (C) an optical device to which the light beams converted into the parallel light by the optical system enter, in which the light beams are guided, and from which the light beams are emitted.

Here, the image display apparatus is pivotally attached to the frame, with a virtual straight line connecting the centers of two eyeballs of the observer who observes the image display apparatus as a pivot axis.

In the image display apparatus according to the embodiment of the invention or the image display apparatus that forms the head mounted display according to the first embodiment of the invention, the central light beam intersects the XY plane at an angle (θ) other than 0 degree. Therefore, there is little limitation to the attachment angle of the image display apparatus when the image display apparatus is attached to the attaching portion of a frame shaped like glasses, and a high degree of freedom in design can be obtained. Further, the image display apparatus that forms the head mounted display according to the second embodiment of the invention is pivotally attached to a frame, with a virtual straight line connecting the centers of two eyeballs of an observer who observes the image display apparatus as a pivot axis. Thus, the possibility that an image emitted from the image display apparatus may be moved away from the eyes of an observer is low, even when the image display apparatus is moved in a vertical direction by pivoting the image display apparatus.

BRIEF DESCRIPTION OF THE DRAWINGS

FIG. 1 is a conceptual diagram of an image display apparatus of Example 1.

FIG. 5 is a conceptual diagram of an image display apparatus of Example 2.

FIGS. 6A and 6B are conceptual diagrams of an image display apparatus of Example 3.

FIG. 7 is a conceptual diagram of an image display apparatus of Example 4.

DESCRIPTION OF THE PREFERRED EMBODIMENTS

Figure 2A:
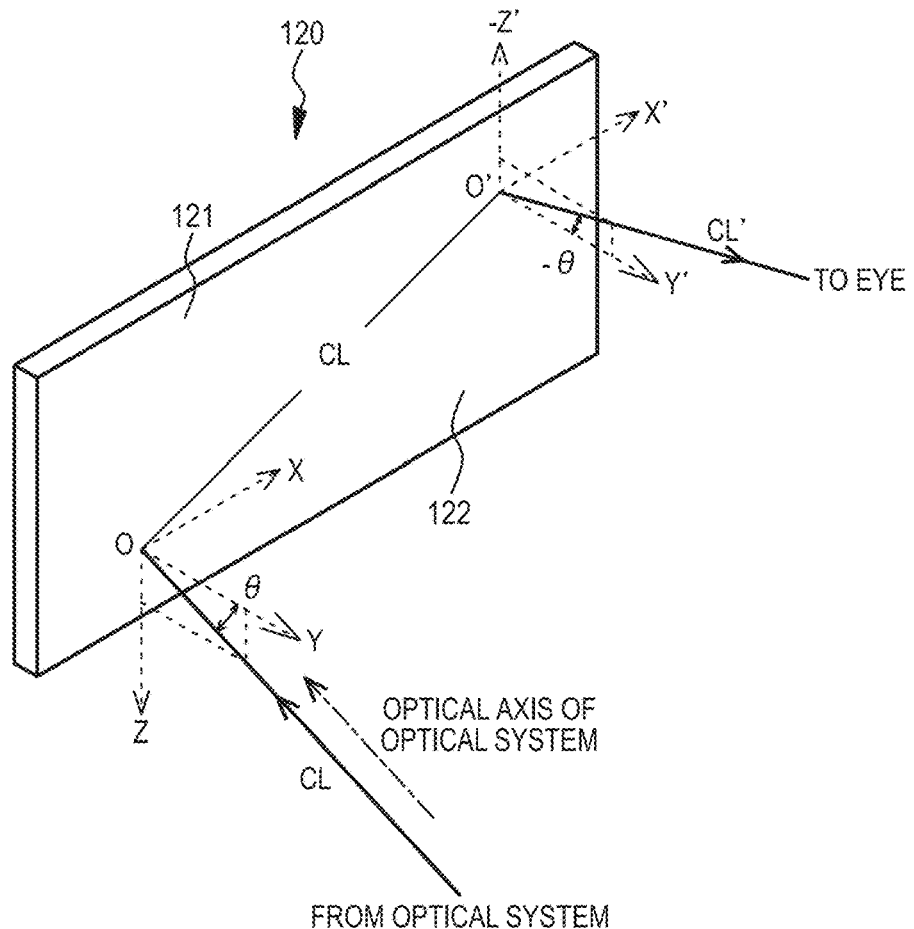
FIGS. 2A and 2B are views schematically showing the propagation of light in a light guide plate that forms the image display apparatus of Example 1, and conceptual diagrams showing an arrangement state of the light guide plate, etc.

Hereinafter, although the invention will be described on the basis of embodiments with reference to the drawings, the invention is not limited to the embodiments, and various numeric values and materials in the embodiments are illustrative. Description will be given in the following order.

1. Overall description relating to image display apparatus and head mounted display of the invention
2. Example 1 (image display apparatus according to one embodiment of the invention, and head mounted display according to first embodiment of the invention
3. Example 2 (modification of Example 1)
4. Example 3 (another modification of Example 1)
5. Example 4 (another modification of Example 1)
6. Example 5 (another modification of Example 1)
7. Example 6 (head mounted display according to second embodiment of the invention), and others

[Overall Description Relating to Image Display Apparatus and Head Mounted Display of the Invention]

A head mounted display according to the first embodiment of the invention can be configured so that an image display apparatus is pivotally attached to a frame, with a virtual straight line connecting the centers of two eyeballs of an observer who observes the image display apparatus as a pivot axis. The head mounted display according to the first embodiment of the invention having this configuration, or a head mounted display according to the second embodiment of the invention can be configured so that at least one of the image forming device, the optical system, and the optical device is pivotally attached to the frame. Further, in the head mounted display according to the second embodiment of the invention including such a configuration, when an observer views a horizontally located object (for example, a horizontal direction, an object at an infinite distance, a horizon, or a horizontal line), a depression angle can be formed by the central light beam that is emitted from the optical device and enter the eyes of the observer. For example, 5 degrees to 45 degrees can be exemplified as the depression angle with respect to the horizontal plane.

In the image display apparatus according to the embodiment of the invention, and an image display apparatus that forms the head mounted display according to the first embodiment of the invention including the above preferable configuration (hereinafter, these are generically and simply referred to as the "image display apparatuses according to the embodiment of the invention"), it is preferable from the viewpoint of ease of handling, setting, and attachment of the image display apparatus that the central light beam be included in the YZ plane.

In the image display apparatuses according to the first embodiment of the invention including the above preferable embodiment, the optical axis of the optical system is included in the YZ plane and intersects the XY plane at angles other than 0 degree. Alternatively, the image display apparatuses can be configured so that the optical axis of the optical system is parallel to the YZ plane, is parallel to the XY plane, and passes through a position shifted from the center of the image forming device.

Further, in the head mounted display according to the first embodiment of the invention including the above preferable embodiment and configuration, the head mounted display can be configured so that, assuming that the XY plane coincides with the horizontal plane, the angle θ at which the central light beam CL intersects the XY plane is an elevation angle. That is, the central light beam impinges on the XY plane toward the XY plane from below the XY plane. In this case, it is preferable that the XY plane intersects the vertical plane at angles other than 0 degree, and it is also preferable that the XY plane intersects the vertical plane at an angle θ. In addition, although the maximum value of θ is not limited, the maximum value can be 5 degrees. Here, the horizontal plane is a plane including a line of sight ("a horizontal line of sight of an observer") when the observer views a horizontally located object (for example, a horizontal direction, an object at an infinite distance, a horizon, or a horizontal line), and including two eyes of the observer which are horizontally located. The vertical plane is a plane that is perpendicular to the horizontal plane and includes two eyes of a horizontally located observer.

Alternatively, in the head mounted display according to the first or second embodiment of the invention, when an observer views a horizontally located object (for example, a horizontal direction, an object at an infinite distance, a horizon, or a horizontal line), a depression angle can be formed by the central light beam that is emitted from the optical device and enters the eyes of the observer. For example, 5 degrees to 45 degrees can be exemplified as the depression angle with respect to the horizontal plane.

In the image display apparatus according to the first embodiment of the invention including the preferable embodiment and configuration described above, and an image display apparatus that forms the head mounted display according to the second embodiment of the invention (hereinafter, these are generically and simply referred to as the "image display apparatuses according to the embodiment of the invention"), the optical device includes:

(a) a light guide plate from which incident light is emitted after the light propagates in the light guide plate by total reflection;

(b) a first deflecting member that deflects the light incident on the light guide plate so that the light incident on the light guide plate is totally reflected in the light guide plate; and (c) a second deflecting member that deflects the light, which propagates in the light guide plate by total reflection, multiple times so as to emit the light, which propagates in the light guide plate by total reflection, from the light guide plate.

Here, the central point of the first deflecting member is an optical device center point. The term "total reflection" refers to total internal reflection or total reflection in the light guide plate. This also applies to the following.

Here, the first deflecting member can reflect the light incident on the light guide plate, and the second deflecting member can transmit and reflect the light, which propagates in the light guide plate by total reflection, multiple times. In this case, the first deflecting member can function as a reflecting mirror, and the second deflecting member can function as a semi-transmissive mirror.

In this configuration, the first deflecting member can be formed by, for example, a light reflective film (a kind of mirror) made of metal including an alloy and configured to reflect the light incident on the light guide plate, or a diffraction grating (e.g., a hologram diffraction grating film) for diffracting the light incident on the light guide plate. The second deflecting member can be formed by a multilayer laminated structure in which multiple dielectric laminated films are laminated, a half mirror, a polarizing beam splitter, or a hologram diffraction grating film. Although the first deflecting member and the second deflecting member are disposed (incorporated) in the light guide plate, the first deflecting member reflects or diffracts parallel light incident on the light guide plate so that the incident parallel light is totally reflected in the light guide plate. On the other hand, the second deflecting member reflects or diffracts the parallel light, which propagates in the light guide plate by total reflection, multiple times, and emits the parallel light from the light guide plate.

Alternatively, the first deflecting member can diffract the light incident on the light guide plate, and the second deflecting member can diffract the light, which propagates in the light guide plate by total reflection, multiple times. In this case, the first deflecting member and the second deflecting member each can be formed by a diffraction grating element. Further, the diffraction grating element can be formed by a reflective diffraction grating element or a transmissive diffraction grating element. Alternatively, one of the diffraction grating elements can be formed by a reflective diffraction grating element, and the other diffraction grating element can be formed by a transmissive diffraction grating element. An example of the reflective diffraction grating element can include a reflective volume hologram diffraction grating. For convenience, the first deflecting member formed by a reflective volume hologram diffraction grating is sometimes referred to as a "first diffraction grating member", and the second deflecting member formed by a reflective volume hologram diffraction grating is sometimes referred to as a "second diffraction grating member".

When an image display in color is performed by the image display apparatuses according to the embodiment of the invention, in order to diffract or reflect a P-number of (e.g., three corresponding to red, green, and blue) types of light beams having a P-number of different wavelength bands (or wavelengths), in the first diffraction grating member or the second diffraction grating member, a P-number of diffraction grating layers, each formed by a reflective volume hologram diffraction grating, can be laminated. Each diffraction grating layer is formed with interference fringes corresponding to one wavelength band (or wavelength). Alternatively, in order to diffract or reflect a P-number of types of light beams having a P-number of different wavelength bands (or wavelengths), the first diffraction grating member or the second diffraction grating member can be formed by one diffraction grating layer that is provided with a P-number of types of interference fringes. Alternatively, for example, the angle of view can be divided into three parts, and the first diffraction grating member or the second diffraction grating member can be formed by laminating diffraction grating layers corresponding to the parts of the angle of view. By adopting these structures, it is possible to increase the diffraction efficiency and acceptable diffraction angle and to optimize the diffraction angle when the light beams having the wavelength bands (or wavelengths) are diffracted or reflected by the first diffraction grating member or the second diffraction grating member.

An example of the material that forms the first diffraction grating member and the second diffraction grating member can include a photopolymer material. The material and basic structure of the first diffraction grating member and the second diffraction grating member formed by the reflective volume hologram diffraction gratings may be the same as those of the reflective volume hologram diffraction gratings in the related art. The reflective volume hologram diffraction grating refers to a hologram diffraction grating that diffracts and reflects only +1-order diffracted light. Although the diffraction grating member is formed with interference fringes extending from the inner side to the outer side of the diffraction grating member, a formation method for the interference fringes may be the same as that adopted in the related art. Specifically, for example, the material that forms the diffraction grating member (e.g., a photopolymer material) is irradiated with object light in a first predetermined direction, and is simultaneously irradiated with reference light in a second predetermined direction, whereby the object light and the reference light may form interference fringes in the material that forms the diffraction grating member. By appropriately selecting the first predetermined direction, the second predetermined direction, and the wavelengths of the object light and the reference light, the interference fringes can be arranged at a desired pitch with a desired slant angle on the surfaces of the diffraction grating member. Here, the slant angle of the interference fringes refers to the angle formed between the surfaces of the diffraction grating member (or the diffraction grating layer) and the interference fringes. When the first diffraction grating member and the second diffraction grating member are formed to have a laminated structure in which a P-number of diffraction grating layers, each formed by a reflective volume hologram diffraction grating, are laminated, a P-number of diffraction grating layers are separately formed, and are then laminated (bonded) with, for example, an ultraviolet curing resin adhesive. Alternatively, a P-number of diffraction grating layers may be formed by forming one diffraction grating layer of an adhesive photopolymer material, and then bonding layers of an adhesive photopolymer material thereon in order.

Alternatively, the image display apparatuses according to the embodiment of the invention can be embodied so that the optical device is formed by a semi-transmissive mirror that the light emitted from the image forming device enters and from which the light is emitted toward the eyes of an observer. The light emitted from the image forming device can enter the semi-transmissive mirror after propagating in the air, or after propagating in a transparent member such as a glass plate or a plastic plate (specifically, a member formed of a material similar to a material that forms the light guide plate, that will be described below). The semi-transmissive mirror may be attached to the image forming device via the transparent member or via a member different from the transparent member.

The image display apparatuses according to the embodiment of the invention including the preferable embodiments and configurations described above can be embodied so that the image forming device has a plurality of pixels arrayed in a two-dimensional matrix. For convenience, the image forming apparatus having this configuration is referred to as an image forming device having a first configuration.

In the image forming device having the first structure, for example, the image forming device can be formed by an image forming device including a reflective spatial light modulator and a light source, an image forming device including a transmissive spatial light modulator and a light source, or an image forming device including a light emitting element such as an organic EL (Electro Luminescent) element, an inorganic EL element, or a light emitting diode (LED). Especially, it is preferable that the image forming device includes a reflective spatial light modulator and a light source. For example, the spatial light modulator can be formed by a light valve, a transmissive or reflective liquid crystal display such as an LCOS (Liquid Crystal On Silicon), or a digital micromirror device (DMD), and the light source can be formed by a light emitting element. Further, the reflective spatial light modulator can include a liquid crystal display and a polarizing beam splitter that reflects and guides part of the light from the light source to the liquid crystal display and transmits and guides part of the light reflected by the liquid crystal display to an optical system. The light emitting element that forms the light source can include, for example, a red light emitting element, a green light emitting element, a blue light emitting element, and a white light emitting element, or white light may be obtained by performing color mixture and luminance equalization for the red light, green light, and blue light emitted from the red light emitting element, the green light emitting element, and the blue light emitting element using light valves. The light emitting element can be formed by a semiconductor laser element, a solid-state laser, or an LED. The number of pixels may be determined according to the specifications of the image display apparatus. For example, a concrete number of pixels can be 320×240, 432×240, 640×480, 1024×768, or 1920×1080.

Alternatively, in the image display apparatuses according to the embodiment of the invention including the preferable embodiments and configurations described above, the image forming device can include a light source, and a scanning member that scans the parallel light emitted from the light source. For convenience, the image forming apparatus having this structure is referred to as "an image forming device having a second configuration".

The light source in the image forming device having the second structure can include a light emitting element as a light source, more specifically, a red light emitting element, a green light emitting element, a blue light emitting element, and a white light emitting element, or white light may be obtained by performing color mixture and luminance equalization for the red light, green light, and blue light emitted from the red light emitting element, the green light emitting element, and the blue light emitting element using light valves. The light emitting element can be formed by a semiconductor laser element, a solid-state laser, or an LED. The number of pixels (virtual pixels) in the image forming device having the second structure can also be determined according to the specifications of the image display apparatus. For example, a concrete number of pixels (virtual pixels) is 320×240, 432×240, 640×480, 1024×768, or 1920×1080. When an image display in color is performed, and the light source includes a red light emitting element, a green light emitting element, and a blue light emitting element, for example, it is preferable to perform color synthesis using a crossed prism. The scanning member can be formed by a MEMS (Micro Electro Mechanical system) having a micromirror rotatable in the two-dimensional direction, or a galvanometer mirror, which scans light emitted from the light source horizontally and vertically.

In the image forming device having a first configuration or the image forming device having a second configuration, the light converted into a plurality of parallel light beams by an optical system (an optical system which converts emitted light into parallel light beams: may be referred to as a "parallel light emitting optical system", and specifically, for example, a collimating optical system or a relay optical system) is caused to enter the light guide plate. The reason why the light beams are to be parallel light beams is based on the fact that it is necessary to store the light wave surface information when such light beams have entered the light guide plate even after the light beams have been emitted from the light guide plate via the first deflecting member and the second deflecting member. In order to generate a plurality of parallel light beams, for example, an optical emitting portion of the image forming device may be located at a place (position) corresponding to the focal length of the parallel light emitting optical system. The parallel light emitting optical system functions to convert positional information of pixels into angular information in the optical system of the optical device. For example, the parallel light emitting optical system can be formed by an optical system which has a positive optical power as a whole and which includes a convex lens, a concave lens, an adjustable surface prism, or a hologram lens alone or a combination of these. A light-shielding member having an opening is arranged between the parallel light emitting optical system and the light guide plate so that the light that is not desired is prevented from being emitted from the parallel light emitting optical system and entering the light guide plate.

The light guide plate has two parallel surfaces (first and second surfaces) extending parallel to the axis (X-axis) of the light guide plate. Assuming that a surface of the light guide plate on which light is incident is an incident surface and a surface of the light guide plate from which light is emitted is an exit surface, both the incident surface and the exit surface may be defined by the first surface, or the incident surface may be defined by the first surface and the exit surface may be defined by the second surface. For example, the light guide plate can be formed of a glass material including optical glass such as quartz glass or BK7, or a plastic material (e.g., PMMA, polycarbonate resin, acrylic resin, amorphous polypropylene resin, or styrene resin including AS resin). The light guide plate is not limited to a flat plate, and may be curved.

By the image display apparatus according to the embodiment of the invention, for example, a head mounted display can be constructed, the reduction in weight and size of an apparatus can be achieved, the discomfort when the apparatus is mounted can be significantly alleviated, and the manufacture cost can be cut down.

In the head mounted display according to the first and second embodiments of the invention including the preferable embodiments and configurations described above, the frame can include a front portion to be arranged at the front of an observer; and two temple portions pivotally attached to opposite ends of the front portion via hinges. An end cover portion is attached to a tip portion of each temple portion. Although the image display apparatus is attached to the frame, specifically, the image forming device may be attached to, for example, the temple portion.

In the head mounted display according to the first or second embodiment of the invention including various kinds of configurations and embodiments described above a nose pad can be attached. That is, when an observer views the whole head mounted display of the embodiment of the invention, the assembly of the frame and the nose pad has almost the same structure as normal eyeglasses except that there is no rim. The material that forms the frame can be the same material as the materials which form normal eyeglasses, such as metal, an alloy, or plastic, and combinations thereof. The nose pad can also have well-known configuration and structure.

In the head mounted display according to the first or second embodiment of the invention, it is desirable from the viewpoints of design or ease of mounting that a wiring line (a signal line, a power line, etc.) that extends from one or two image forming devices extends to the outside from a tip portion of an end cover portion via a temple portion and the inside of the end cover portion, and is connected to an external circuit (a control circuit). Further, it can be embodied so that each image forming device includes a headphone portion, and a wiring line for the headphone portion from each image forming device extends to the headphone portion via the temple portion and the inside of the end cover portion from the tip portion of the end cover portion. The headphone portion can include, for example, an inner ear type headphone portion and a canal type headphone portion. More specifically, it is preferable that the wiring line for the headphone portion extends to the headphone portion from the tip portion of the end cover portion so as to wrap around behind the auricle (external ear).

The head mounted display according to the first or second embodiment of the invention can be used for, for example, the display of a title of a film; the display of various description in a play, a kabuki, a Noh, a kyogen, an opera, a concert, a ballet, various theaters, an amusement park, an art museum, a tourist resort, a pleasure resort, a sightseeing guide, etc.; the display of various descriptions or symbols, signs, marks, emblems, designs, etc. in the operation, manipulation, maintenance, disassembling, etc. of various apparatuses; the display of various descriptions or symbols, signs, marks, emblems, designs, etc. concerning persons, objects. etc.; and the display of closed captions.

EXAMPLE 1

Figure 2B:
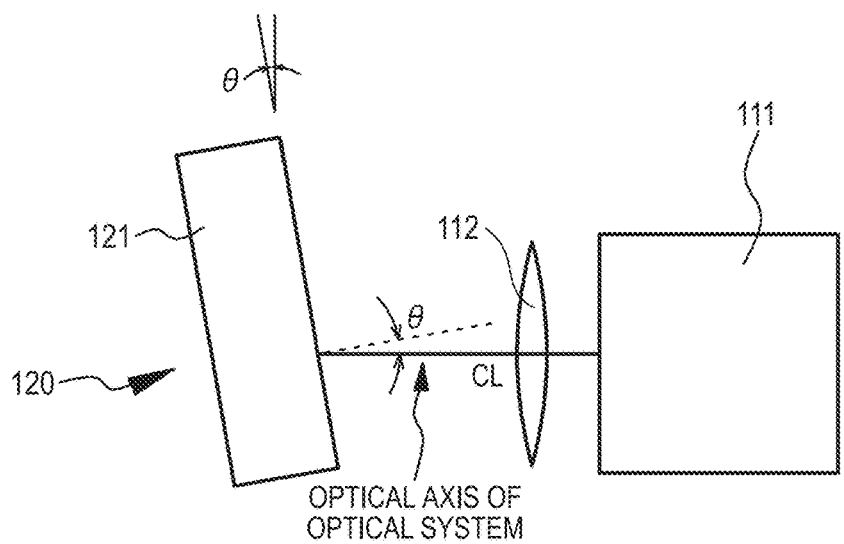
Figure 3:
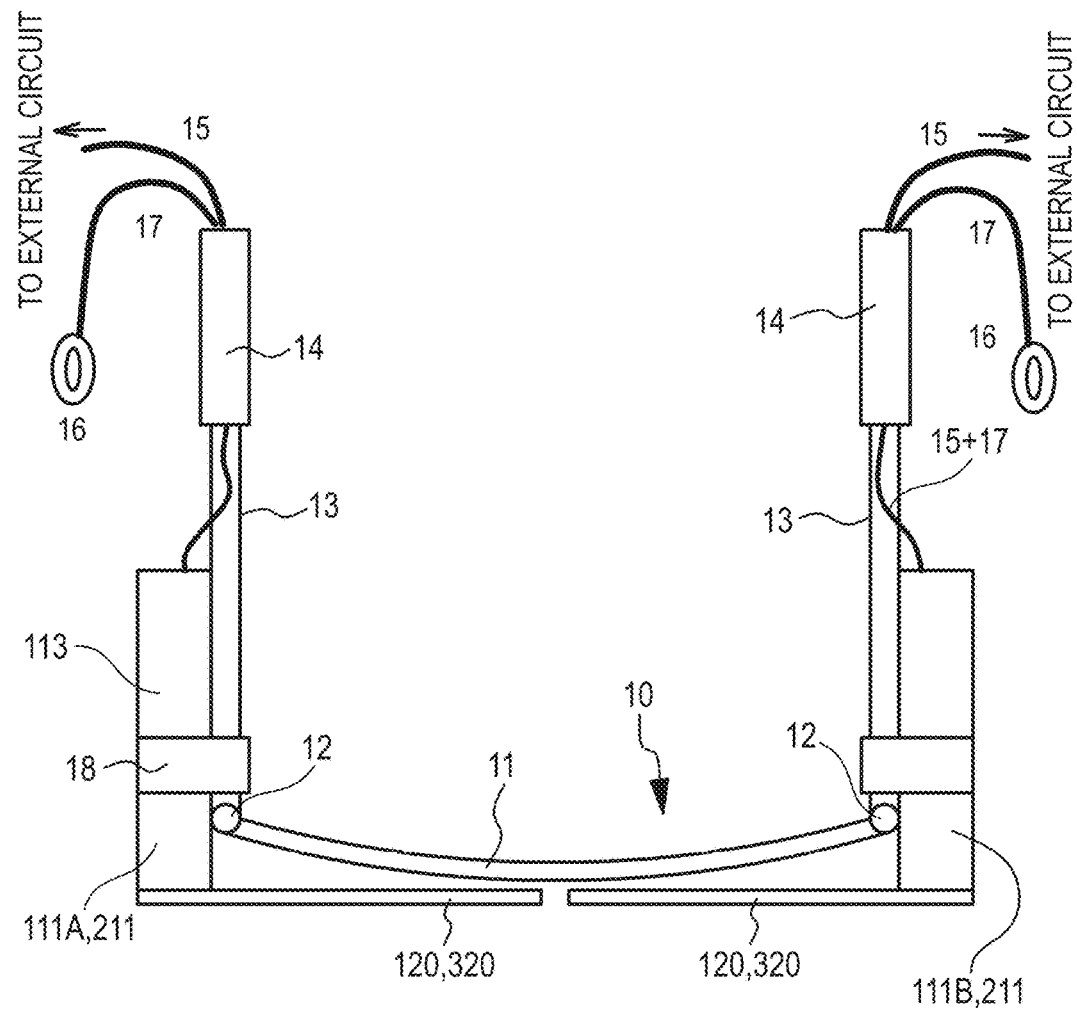
FIG. 3 is a schematic view when a head mounted display of Example 1 is viewed from above.
Figure 4:
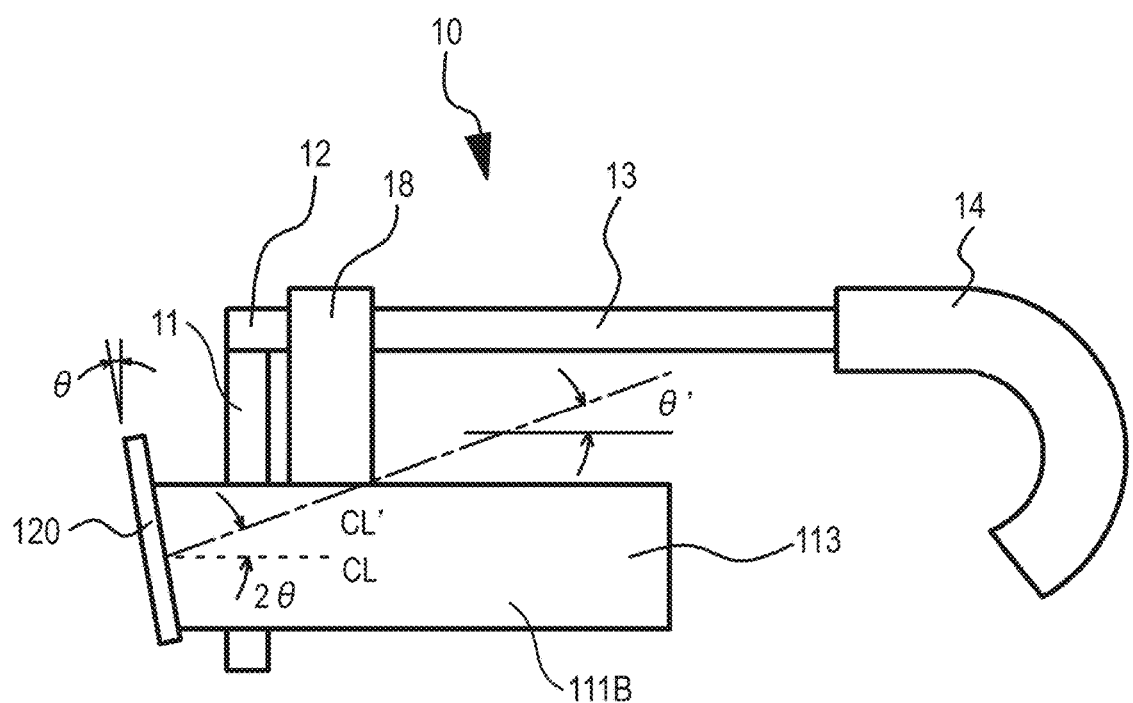
FIG. 4 is a schematic view when the head mounted display of Example 1 is viewed from the side.

Example 1 relates to an image display apparatus according to the embodiment of the invention, and a head mounted display according to a first embodiment of the invention. A conceptual diagram of the image display apparatus of Example 1 is shown in FIG. 1, the propagation of light in a light guide plate that forms the image display apparatus of Example 1 is schematically shown in FIG. 2A, and a conceptual diagram showing an arrangement state of the light guide plate, etc. that forms the image display apparatus of Example 1 is shown in FIG. 2B. Further, a schematic view when the head mounted display of Example 1 is viewed from above is shown in FIG. 3, and a schematic view when the head mounted display is viewed from the side is shown in FIG. 4.

In Example 1 or Examples 2 to 6 that will be described below, an image display apparatus 100, 200, 300, or 400 includes:

(A) an image forming device 111 or 211;

(B) an optical system (parallel light emitting optical system) 112 or 254 that converts light emitted from the image forming device 111 or 211 into parallel light; and (C) an optical device 120 or 320 which the light beams converted into the parallel light by the optical system 112 or 254 enter, and are guided therein, and emitted therefrom.

Further, a head mounted display of Example 1 or Examples 2 to 6 that will be described below includes (a) a frame 10 shaped like glasses to be worn on the head of an observer, and (b) the image display apparatus 100, 200, 300, and 400 attached to the frame 10. In addition, although a both-eyes type display including two image display apparatuses has specifically been adopted as the head mounted display of the embodiment, a one-eye type display including one image display apparatus may be adopted. The image forming device 111 or 211 displays a monochromatic image.

In Example 1 or Examples 2 to 6 that will be described below, when the point where a central light beam CL that is emitted from the center of the image forming device 111 or 211 and passes through the nodal point of the optical system 112 or 254 on the side of the image forming device enters the optical device 120 or 320 is defined as an optical device center point O, an axis that passes through the optical device center point O, and is parallel to the axis direction of the optical device 120 or 320 is defined as an X-axis, and an axis that passes through the optical device center point O, and coincides with the normal axis of the optical device 120 or 320 is defined as a Y-axis, the central light beam CL intersects the XY plane at angles (θ) other than 0 degree. The central light beam CL is included in the YZ plane.

In Example 1, or Examples 2 to 4, and 6 that will be described below, the optical axis of the optical system 112 or 254 is included in the YZ plane, and intersects the XY plane at angles other than 0 degree, specifically, an angle θ (refer to FIGS. 2A and 2B).

In the head mounted display of Example 1, or Examples 2 to 6 that will be described below, assuming that the XY plane coincides with the horizontal plane, the angle θ at which the central light beam CL intersects the XY plane is an elevation angle. That is, the central light beam CL impinges on the XY plane toward the XY plane from below the XY plane. The XY plane intersects a vertical plane at angles other than 0 degree, specifically, an angle θ.

Figure 8A:
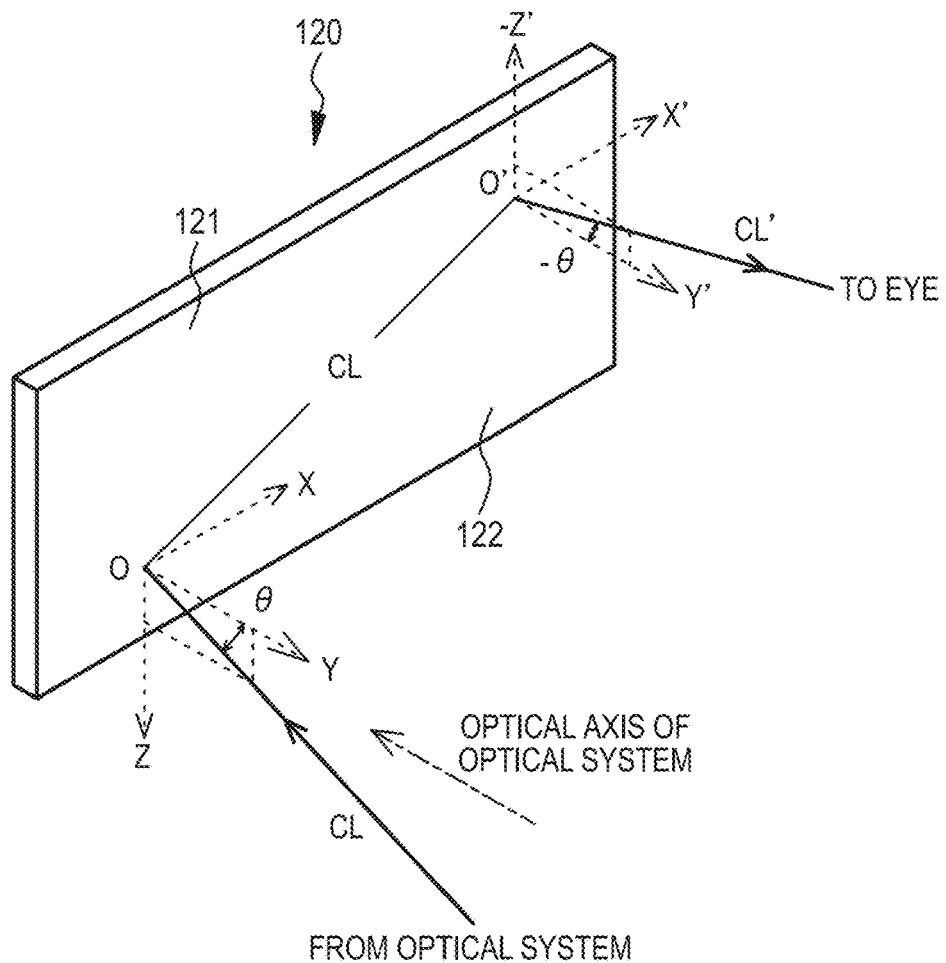
FIGS. 8A and 8B are views schematically showing the propagation of light in a light guide plate that forms an image display apparatus of Example 5, and conceptual diagrams showing an arrangement state of the light guide plate, etc.

In Example 1, θ=5 degrees. More specifically, in such a configuration, the central light beam CL (shown by a dotted line in FIG. 4) is included in the horizontal plane. The optical device 120 or 320 is tilted by the angle θ with respect to the vertical plane. In other words, the optical device 120 or 320 is tilted by the degree of an angle (90−θ) with respect to the horizontal plane. Further, a central light beam CL' (shown by a one-dot chain line in FIG. 4) emitted from the optical device 120 or 320 is tilted by an angle 2θ with respect to the horizontal plane. That is, when an observer views the horizontal direction and an object at an infinite distance, the central light beam CL' that is emitted from the optical device 120 or 320 and enters the eyes of the observer forms a depression angle θ' (=2θ). The angle that the central light beam CL' forms with the normal axis of the optical device 120 or 320 is θ. In FIG. 2A, or FIG. 8A that will be described below, a point where the central light beam CL' is emitted from the optical device 120 or 320 is represented by O', and axes passing through the point O' and parallel to the X-axis, the Y-axis, and the Z-axis are represented by an X'-axis, an Y'-axis, and an Z'-axis. In addition, the central light beam CL emitted from the center of the image forming device 111 or 211 is not limited to the form in which the central light beam is included in the horizontal plane, and can be embodied so that the central light beam intersects the horizontal plane at a desired angle degree (may be an elevation angle or a depression angle) other than 0 degree. Further, when an observer views the horizontal direction and an object at an infinite distance, it can be embodied so that the central light beam CL' that is emitted from the optical device 120 or 320 and enters the eyes of the observer forms an elevation angle.

In Example 1 or Examples 2 to 6 that will be described below, the optical device 120 or 320 includes:

(a) a light guide plate 121 or 321 from which incident light is emitted after the light propagates in the light guide plate by total reflection;

(b) a first deflecting member 130 or 330 that deflects the light incident on the light guide plate 121 or 321 so that the light incident on the light guide plate 121 or 321 is totally reflected in the light guide plate 121 or 321; and (c) a second deflecting member 140 or 340 that deflects the light, which propagates in the light guide plate 121 or 321 by total reflection, multiple times so as to emit the light, which propagates in the light guide plate 121 or 321 by total reflection, from the light guide plate 121 or 321. The central point of the first deflecting member 130 or 330 is an optical device central point O. The optical device 120 to 320 is a see-through type (semi-transmissive).

Here, in Example 1, the first deflecting member 130 and the second deflecting member 140 are disposed in the light guide plate 121. The first deflecting member 130 reflects light incident on the light guide plate 121, and the second deflecting member 140 transmits and reflects the light, which propagates in the light guide plate 121 by total reflection, multiple times. That is, the first deflecting member 130 functions as a reflecting mirror, and the second deflecting member 140 functions as a semi-transmissive mirror. More specifically, the first deflecting member 130 provided in the light guide plate 121 is formed by a light reflective film (a kind of mirror) made of aluminum and configured to reflect light incident on the light guide plate 121. On the other hand, the second deflecting member 140 provided in the light guide plate 121 is formed by a multilayer laminated structure in which multiple dielectric laminated films are laminated. The dielectric laminated films include, for example, a TiO2 film made of a high dielectric constant material and a SiO2 film made of a low dielectric constant material. The multilayer laminated structure in which multiple dielectric laminated films are laminated is disclosed in JP-T-2005-521099. Although six dielectric laminated films are shown in the drawing, the number of dielectric laminated films is not limited thereto. Thin pieces made of the same material as that of the light guide plate 121 are sandwiched between the dielectric laminated films. The first deflecting member 130 reflects (or diffracts) parallel light incident on the light guide plate 121 so that the parallel light incident on the light guide plate 121 is totally reflected in the light guide plate 121. On the other hand, the second deflecting member 140 reflects (or diffracts) the parallel light, which propagates in the light guide plate 121 by total reflection, multiple times, and emits the parallel light toward the eye 41 of an observer from the light guide plate 121.

An inclined surface where the first deflecting member 130 is to be formed is formed in the light guide plate 121 by cutting out a portion 124 of the light guide plate 121 in which the first deflecting member 130 is to be provided, a light reflective film is formed on the inclined surface by vacuum deposition, and the cut portion 124 of the light guide plate 121 is then bonded to the first deflecting member 130. Further, a multilayer laminated structure, in which multiple layers made of the same material (e.g., glass) as that of the light guide plate 121 and multiple dielectric films (for example, formed by vacuum deposition) are laminated, is formed, an inclined surface is formed by cutting out a portion 125 of the light guide plate 121 where the second deflecting member 140 is to be formed, the multilayer laminated structure is bonded to the inclined surface, and the outer side of the light guide plate is shaped by, for example, polishing. Thus, the optical device 120 in which the first deflecting member 130 and the second deflecting member 140 are provided in the light guide plate 121 can be obtained.

Here, in Example 1, or Examples 2 to 6 that will be described below, the light guide plate 121 or 321 formed of optical glass or a plastic material has two parallel surfaces (first surface 122 or 322 and second surface 123 or 323) extending parallel to a light propagation direction (X-axis) by the total internal reflection of the light guide plate 121 or 321. The first surface 122 or 322 and the second surface 123 or 323 face each other. Parallel light enters from the first surface 122 or 322 serving as a light incident surface, propagates in the light guide plate 121 by total reflection, and is then emitted from the first surface 122 or 322 serving as a light exit surface. However, the invention is not limited thereto, and the light incidence surface may be formed by the second surface 123 or 323, and the light exit surface may be formed by the first surface 122 or 322.

In Example 1 or Examples 3 that will be described below, the image forming device 111 is the image forming device having a first configuration, and has a plurality of pixels arrayed in a two-dimensional matrix. The image forming device 111 includes a reflective spatial light modulator 150 and a light source 153 formed by a light emitting diode for emitting white light. The whole image forming device 111 is stored in a housing 113 (shown by a one-dot chain line in FIG. 1), an opening (not shown) is provided in the housing 113, and light is emitted through the opening from the optical system (the parallel light emitting optical system or the collimating optical system) 112. The reflective spatial light modulator 150 includes a liquid crystal display (LCD) 151 formed by an LCOS serving as a light valve, and a polarizing beam splitter 152 that reflects and guides part of the light from the light source 153 to the liquid crystal display 151 and transmits and guides part of the light reflected by the liquid crystal display 151 to the optical system 112. The liquid crystal display 151 includes a plurality of (e.g., 640×480) pixels (liquid crystal cells) arrayed in a two-dimensional matrix. The polarizing beam splitter 152 has the same configuration and structure as those of the related art. Unpolarized light emitted from the light source 153 impinges on the polarizing beam splitter 152. P-polarized light components pass through the polarizing beam splitter 152, and are emitted to the outside of the system. On the other hand, S-polarized light components are reflected by the polarizing beam splitter 152, enter the liquid crystal display 151, are reflected in the liquid crystal display 151, and are then emitted from the liquid crystal display 151. Here, light emitted from pixels for displaying white, of light emitted from the liquid crystal display 151, contains many P-polarized light components, and light emitted from pixels for displaying black contains many S-polarized light components. Therefore, P-polarized light components, of the light that is emitted from the liquid crystal display 151 and impinges on the polarizing beam splitter 152, pass through the polarizing beam splitter 152, and are guided to the optical system 112. On the other hand, S-polarized light components are reflected by the polarizing beam splitter 152, and return to the light source 153. The optical system 112 is formed by, for example, a convex lens. In order to generate parallel light, the image forming device 111 (concretely, the liquid crystal display 151) is arranged at a place (position) corresponding to the focal length of the optical system 112.

The frame 10 is formed by a front portion 11 arranged at the front of an observer, two temple portions 13 pivotally attached to both ends of the front portion 11 via hinges 12, and an end cover portion (referred to as a tip cell, an earmuff, and an ear pad) 14 attached to a tip portion of each temple portion 13. Further, a nose pad (not shown) is attached to the frame. Further, each housing 113 is detachably attached to the temple portion 13 by the attaching member 18. The frame 10 is made of metal or plastic. The housing 113 may be attached so that the housing can be attached to or detached from the temple portion 13 by the attaching member 18. Each housing 113 may be detachably attached to the temple portion of the frame of the eyeglasses that is possessed by an observer who possesses and wears the eyeglasses by the attaching member 18.

A wiring line (a signal line, a power line, etc.) 15 that extends from one image forming device 111A extends to the outside from the tip portion of the end cover portion 14 via the temple portion 13 and the inside of the end cover portion 14. Each image forming device 111A or 111B includes a headphone portion 16, and a wiring line 17 for the headphone portion that extends from each image forming device 111A or 111B extends to the headphone portion 16 via the temple portion 13 and the inside of the end cover portion 14 from the tip portion of the end cover portion 14. More specifically, the wiring line 17 for the headphone portion extends to the headphone portion 16 from the tip portion of the end cover portion 14 so as to wrap around behind the auricle (external ear). By adopting such a configuration, a neat head mounted display can be formed without giving the impression that the headphone portion 16 and the wiring line 17 for the headphone portion is randomly arranged.

In the image display apparatus of Example 1, or the image display apparatus that forms the head mounted display of Example 1, the central light beam CL intersects the XY plane at an angle (θ) other than 0 degree. Here, when the central light beam CL' that is emitted from the optical device and enters the eyes of an observer forms the depression angle θ', the relationship of θ'=2θ is satisfied. On the other hand, in the related art, it is necessary to tilt the whole image display apparatus by the angle θ" when it is intended to obtain the same depression angle. Here, the relationship between θ" and θ is θ"=2θ. Eventually, in the related art, the optical device should be tilted by 2θ with respect to the vertical plane. On the other hand, in Example 1, the optical device has only to be tilted by θ with respect to the vertical plane, and the image forming device has only to be horizontally held. Therefore, there is little limitation to the attachment angle of the image display apparatus when the image display apparatus is attached to the attaching portion of a frame shaped like glasses, and a high degree of freedom in design can be obtained. Further, since the tilt of the optical device with respect to the vertical plane is smaller than that in the related art, a phenomenon that outdoor daylight is reflected by the optical device and enters the eyes of an observer hardly occurs compared to the related art. Therefore, a high-quality image can be displayed.

EXAMPLE 2

Example 2 is a modification of Example 1. FIG. 5 is a conceptual view of an image display apparatus 200 in a head mounted display according to Example 2. As shown in FIG. 5, an image forming device 211 in Example 2 is formed by an image forming device having a second configuration. That is, the image forming device includes a light source 251, and a scanning member 253 that scans the parallel light emitted from the light source 251. More specifically, the image forming device 211 includes:

(a) a light source 251;

(b) a collimating optical system 252 that converts light emitted from the light source 251 into parallel light;

(c) a scanning member 253 that scans the parallel light emitted from the collimating optical system 252; and (d) a relay optical system 254 that relays and emits the parallel light scanned by the scanning member 253. In addition, the whole image forming device 211 is stored in a housing 213 (shown by a one-dot chain line in FIG. 5), an opening (not shown) is provided in the housing 213, and light is emitted through the opening from the relay optical system 254. Each housing 213 is detachably attached to the temple portion 13 by the attaching member 18.

The light source 251 includes a light emitting element for emitting white light. The light emitted from the light source 251 enters the collimating optical system 252 having a positive optical power as a whole, and is emitted as parallel light. The parallel light is reflected by a total reflection mirror 256, is horizontally and vertically scanned by the scanning member 253 formed by an MEMS that can rotate a micromirror in a two-dimensional direction so as to two-dimensionally scan the incident parallel light, and is converted into a kind of two-dimensional image, whereby virtual pixels (the number of pixels can be made the same as that of Example 1) are generated. The light from the virtual pixels passes through the relay optical system 254 formed by a relay optical system of the related art, and light beams converted into parallel light enter the optical device 120.

The light beams converted into the parallel light by the relay optical system 254 enter the optical device 120, and are guided therein, and emitted therefrom. Since the optical device 120 has the same configuration and structure as that of the optical device adopted in Example 1, a detailed description thereof is omitted. Further, since the head mounted display of Example 2 has substantially the same configuration and structure as those of the head mounted display of Example 1 except that the image forming device 211 is different, as described above, a detailed description thereof is omitted.

EXAMPLE 3

Example 3 is also a modification of Example 1. FIG. 6A is a conceptual view of an image display apparatus 300 in a head mounted display according to Example 3. FIG. 6B is an enlarged schematic sectional view of a part of a reflective volume hologram diffraction grating. In Example 3, an image forming device 111 is formed by an image forming device having a first configuration, similarly to Example 1. An optical device 320 has the same basic configuration and structure as those of the optical device 120 of Example 1 except in the configuration and structure of a first deflecting member and a second deflecting member.

In Example 3, the first deflecting member and the second deflecting member are disposed on a surface of the light guide plate 321 (concretely, a second surface 323 of the light guide plate 321). The first deflecting member diffracts light incident on the light guide plate 321, and the second deflecting member diffracts the light, which propagates in the light guide plate 321 by total reflection, multiple times. Here, each of the first and second deflecting members is formed by a diffraction grating element, specifically, a reflective diffraction grating element, and more specifically, a reflective volume hologram diffraction grating. In the following description, for convenience, the first deflecting member formed by a reflective volume hologram diffraction grating is sometimes referred to as a "first diffraction grating member 330", and the second deflecting member formed by a reflective volume hologram diffraction grating is sometimes referred to as a "second diffraction grating member 340".

In Example 3, or Example 4 that will be described below, in each of the first diffraction grating member 330 and the second diffraction grating member 340, one diffraction grating layer is laminated. Each diffraction grating layer made of a photopolymer material is formed with interference fringes corresponding to one wavelength band (or wavelength), and the interference fringes are formed by a method in the related art. The interference fringes formed on the diffraction grating layers (diffraction optical elements) linearly extend at a fixed pitch and parallel to the Z-axis direction. The axis of the first diffraction grating member 330 and the axis of the second diffraction grating member 340 are parallel to the X-axis, and the normal axis is parallel to the Y-axis.

FIG. 6B is an enlarged schematic partial sectional view of a reflective volume hologram diffraction grating. The reflective volume hologram diffraction grating is formed with interference fringes having a slant angle φ. Here, the slant angle φ refers to the angle formed between the surface of the reflective volume hologram diffraction grating and the interference fringes. The interference fringes are formed to extend from the inner side to the outer side of the reflective volume hologram diffraction grating. The interference fringes satisfy the Bragg condition. Here, the Bragg condition is to satisfy the following Expression A. In Expression A, m is a positive integer, λ represents the wavelength, d represents the pitch of the grating surface (distance between virtual planes including interference fringes in the normal direction), and Θ represents the supplementary angle of the incidence angle on the interference fringes. When light enters the diffraction grating member at an incidence angle ψ, the supplementary angle Θ, the slant angle ψ, and the incidence angle ψ have the relationship given by Expression B:

$$M \cdot \lambda = 2 \cdot d \cdot \sin(\Theta) \quad \text{(A)}$$

$$\Theta = 90° - (\varphi + \psi) \quad \text{(B)}$$

As described above, the first diffraction grating member 330 is disposed (bonded) on the second surface 323 of the light guide plate 321, and diffracts and reflects parallel light incident on the light guide plate 321 from the first surface 322 so that the parallel light incident on the light guide plate 321 is totally reflected in the light guide plate 321. Further, as described above, the second diffraction grating member 340 is disposed (bonded) on the second surface 323 of the light guide plate 321, and diffracts and reflects the parallel light, which propagates in the light guide plate 321 by total reflection, multiple times, and emits the parallel light from the light guide plate 321 through the first surface 322.

The parallel light also propagates in the light guide plate 321 by total reflection, and is then emitted. In this case, since the light guide plate 321 is thin and the optical path in the light guide plate 321 is long, the number of total reflections made until the light beams reach the second diffraction grating member 340 varies according to the angle of view. More specifically, the number of reflections of parallel light that is incident at an angle such as to approach the second diffraction grating member 340, of parallel light incident on the light guide plate 321, is smaller than the number of reflections of parallel light that is incident on the light guide plate 321 at an angle such as to get away from the second diffraction grating member 340. This is because the parallel light, which is diffracted and reflected by the first diffraction grating member 330 and is incident on the light guide plate 321 at the angle such as to approach the second diffraction grating member 340, forms a smaller angle to the normal angle at the light guide plate 321 when the light propagating in the light guide plate 321 impinges on the inner surface of the light guide plate 321, than the parallel light that is incident on the light guide plate 321 at the angle in the opposite direction. The shape of the interference fringes formed in the second diffraction grating member 340 and the shape of the interference fringes formed in the first diffraction grating member 330 are symmetrical with respect to an imaginary plane perpendicular to the axis of the light guide plate 321.

The light guide plate 321 in Example 4 that will be described below has the same configuration and structure as those of the light guide plate 321 described above.

Since the head mounted display of Example 3 has substantially the same configuration and structure as those of the head mounted display of Example 1 except that the optical device 320 is different, as described above, a detailed description thereof is omitted.

EXAMPLE 4

Example 4 is a modification of Example 3. FIG. 7 is a conceptual view of an image display apparatus in a head mounted display according to Example 4. In an image display apparatus 400 of Example 4, a light source 251, a collimating optical system 252, a scanning member 253, a parallel light emitting optical system (a relay optical system 254), etc. have the same configuration and structure (the image forming device having a second configuration) as those adopted in Example 2. Further, an optical device 320 has the same configuration and structure as those of the optical device 320 in Example 3. Since the head mounted display of Example 4 has substantially the same configuration and structure as those of the head mounted display of Example 1 except the above-described differences, a detailed description thereof is omitted.

EXAMPLE 5

Figure 8B:
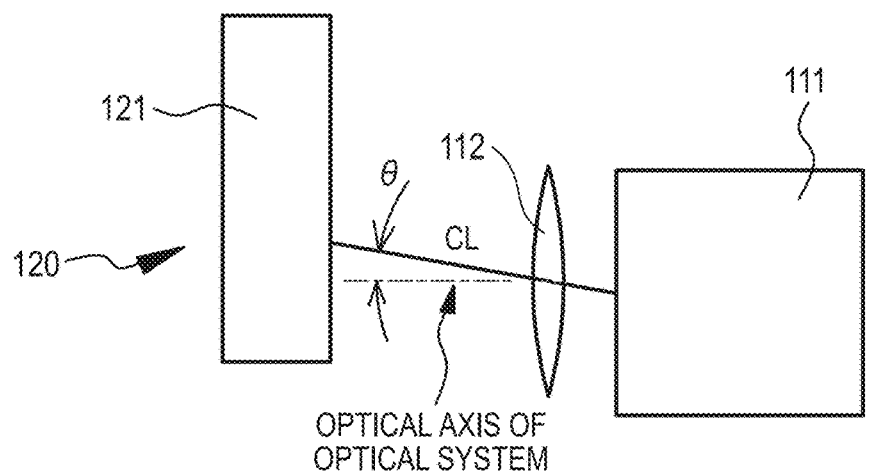

Example 5 is a modification of Example 1. The propagation of light in a light guide plate that forms the image display apparatus of Example 5 is schematically shown in FIG. 8A, and a conceptual diagram showing an arrangement state of a light guide plate, etc. that forms the image display apparatus of Example 5 is shown in FIG. 8B. Here, in Example 5, the optical axis of the optical system (the parallel light emitting optical system or the collimating optical system) 112 is parallel to the YZ plane, is parallel to the XY plane, and passes through a position shifted from the center of the image forming device 111. By adopting such a configuration, the central light beam CL is included in the YZ plane, and intersects the XY plane at an elevation angle θ.

EXAMPLE 6

Figure 9:
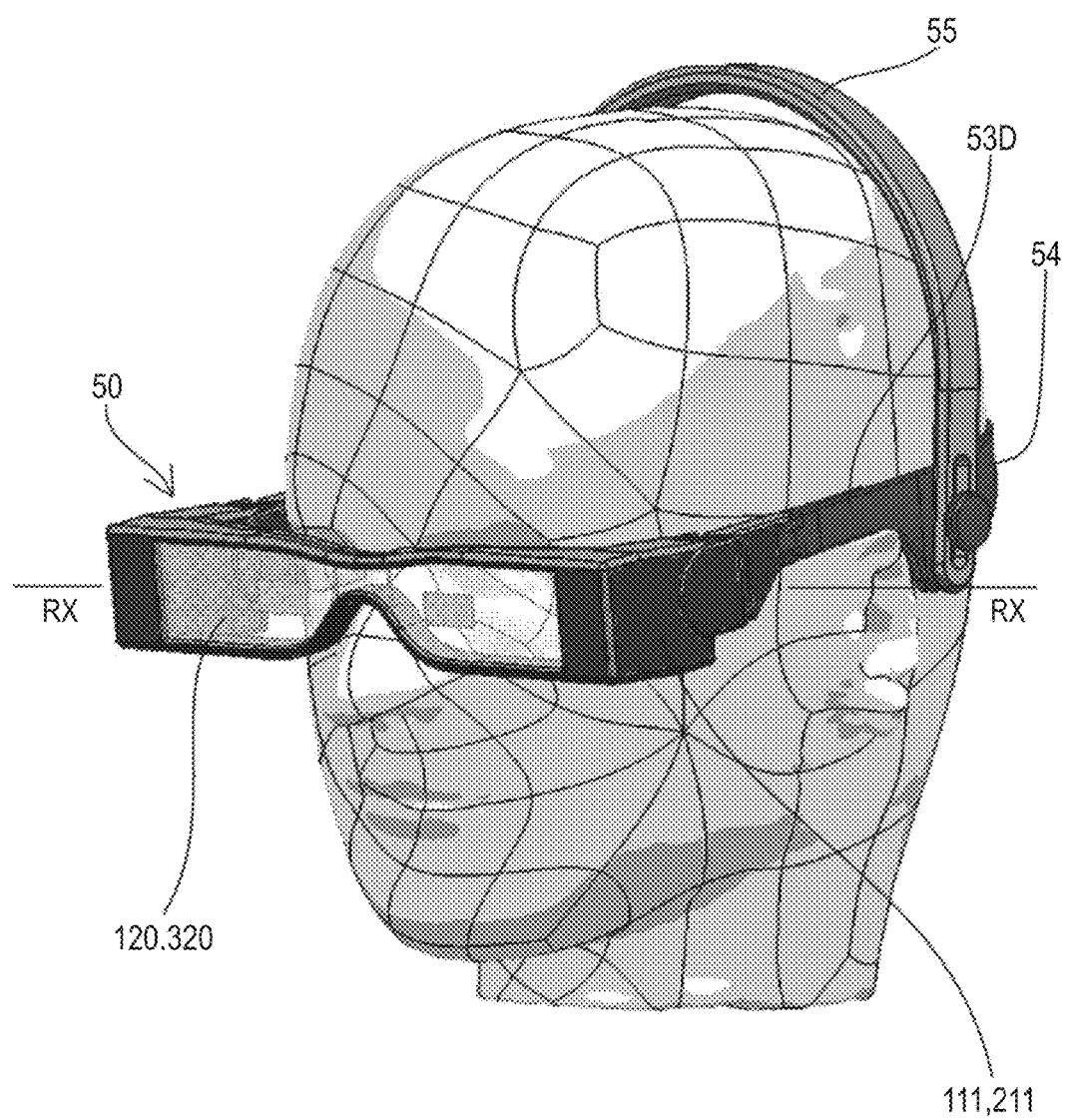
FIG. 9 is a view when a state where an image display apparatus of Example 6 is worn on the head of an observer is obliquely viewed.
Figure 10:
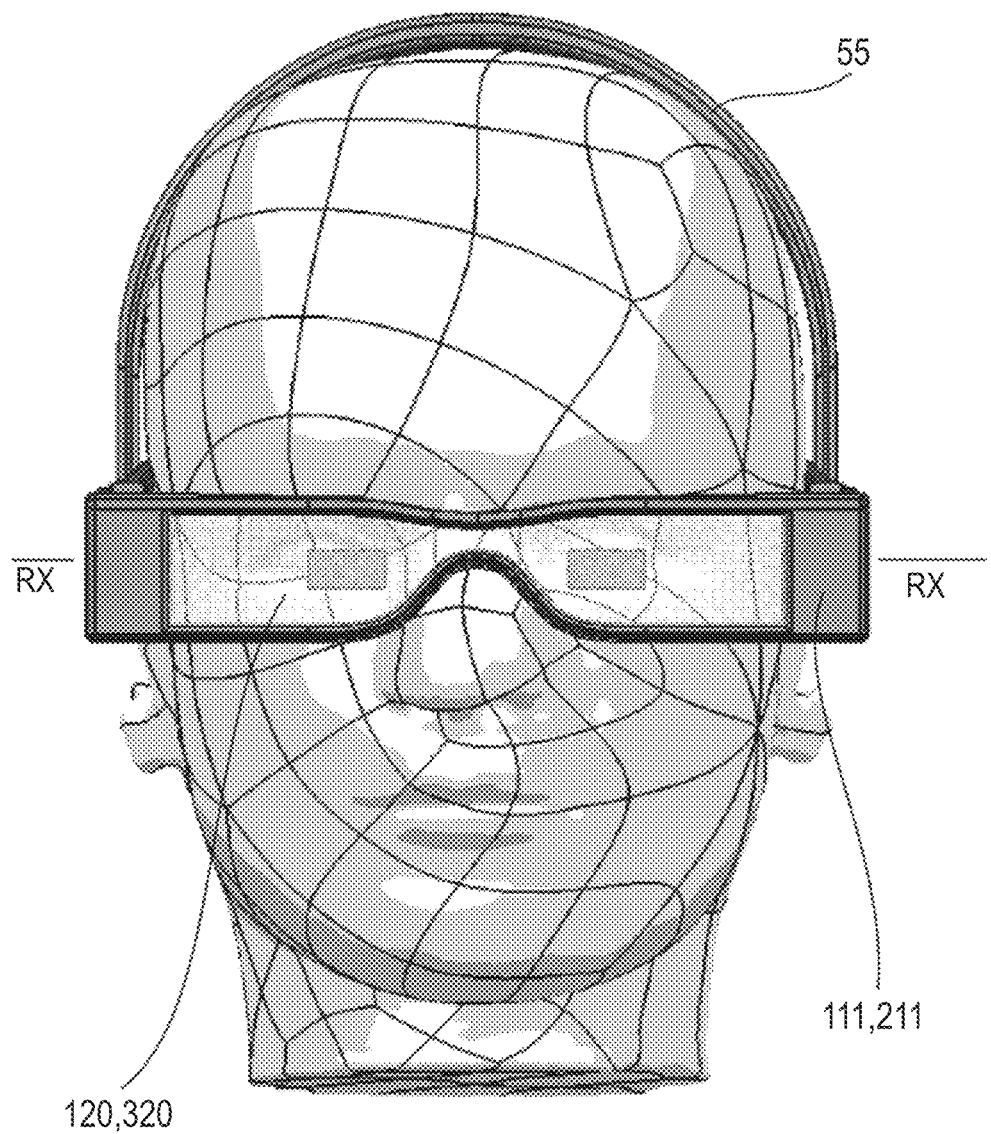
FIG. 10 is a view when the state where the image display apparatus of Example 6 is worn on the head of an observer is viewed from the front.
Figure 11:
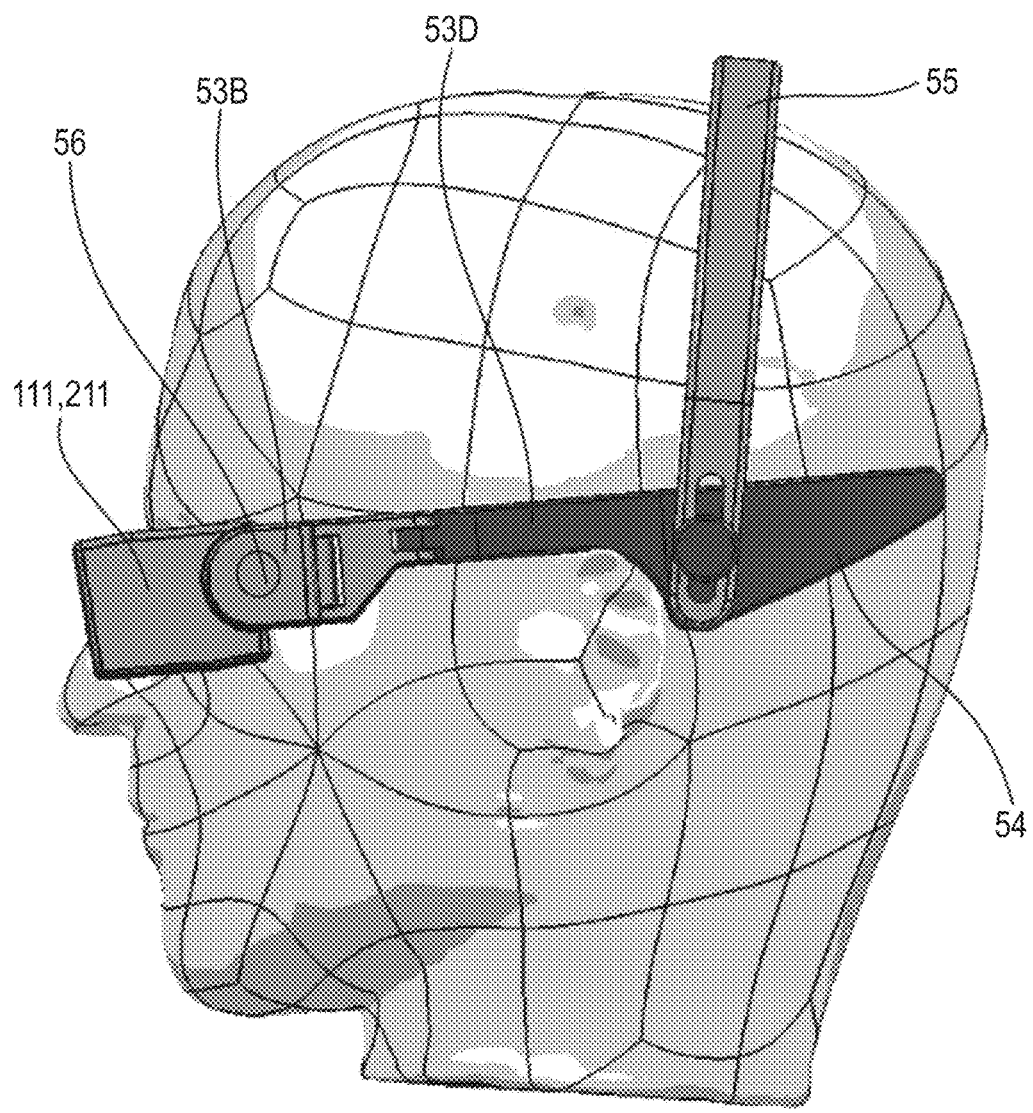
FIG. 11 is a view when the state where the image display apparatus of Example 6 is worn on the head of an observer is viewed from the side.
Figure 12:
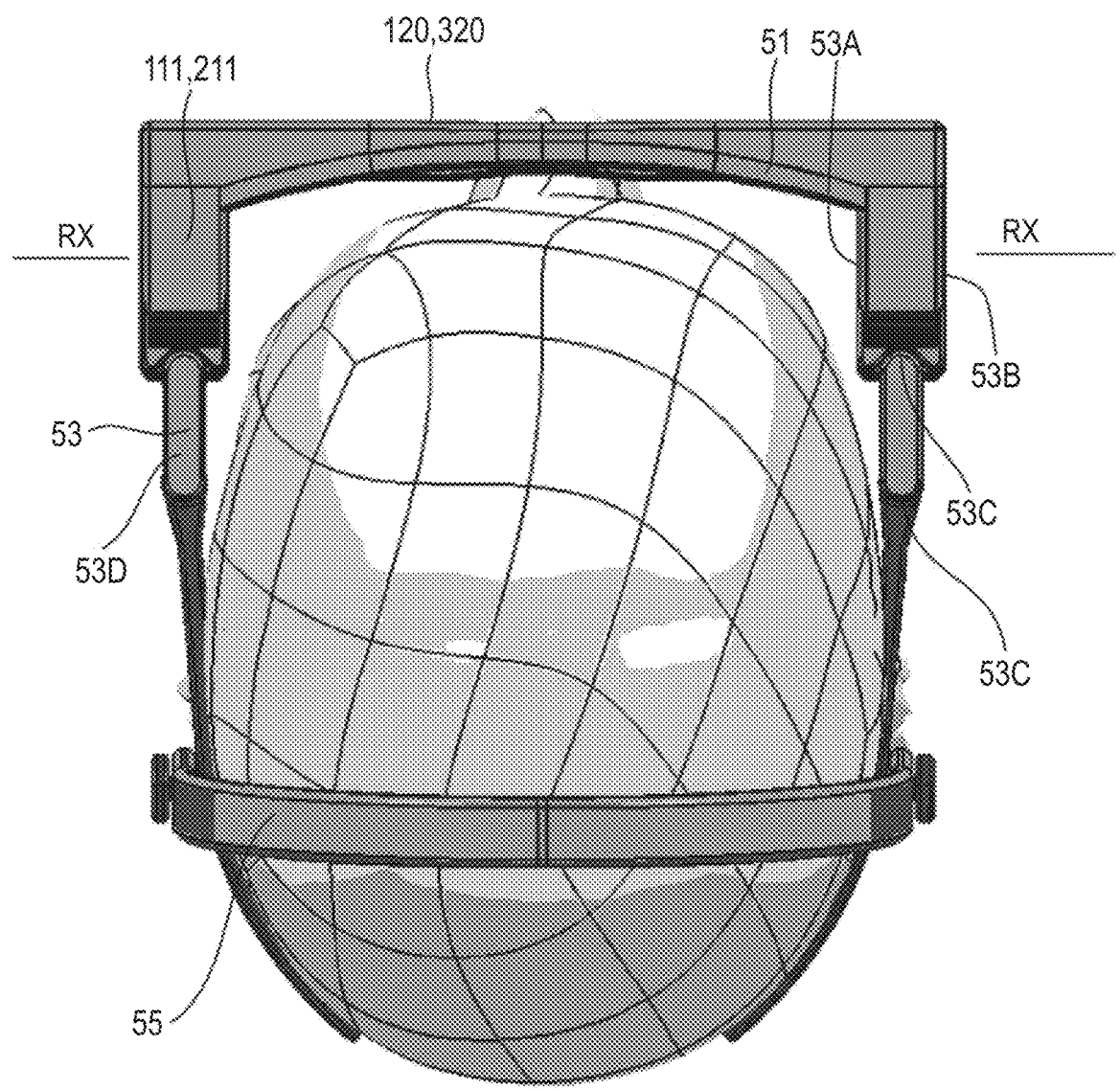
FIG. 12 is a view when the state where the image display apparatus of Example 6 is worn on the head of an observer is viewed from above.
Figure 13:
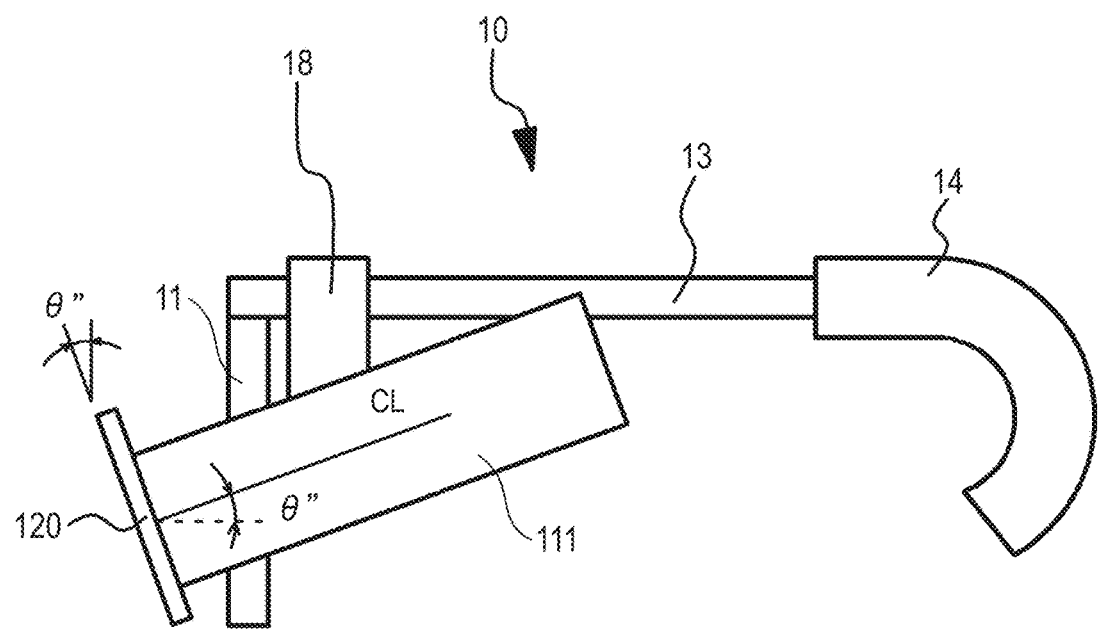
FIG. 13 is the schematic view when a head mounted display in the related art is viewed from the side.
Figure 14A:
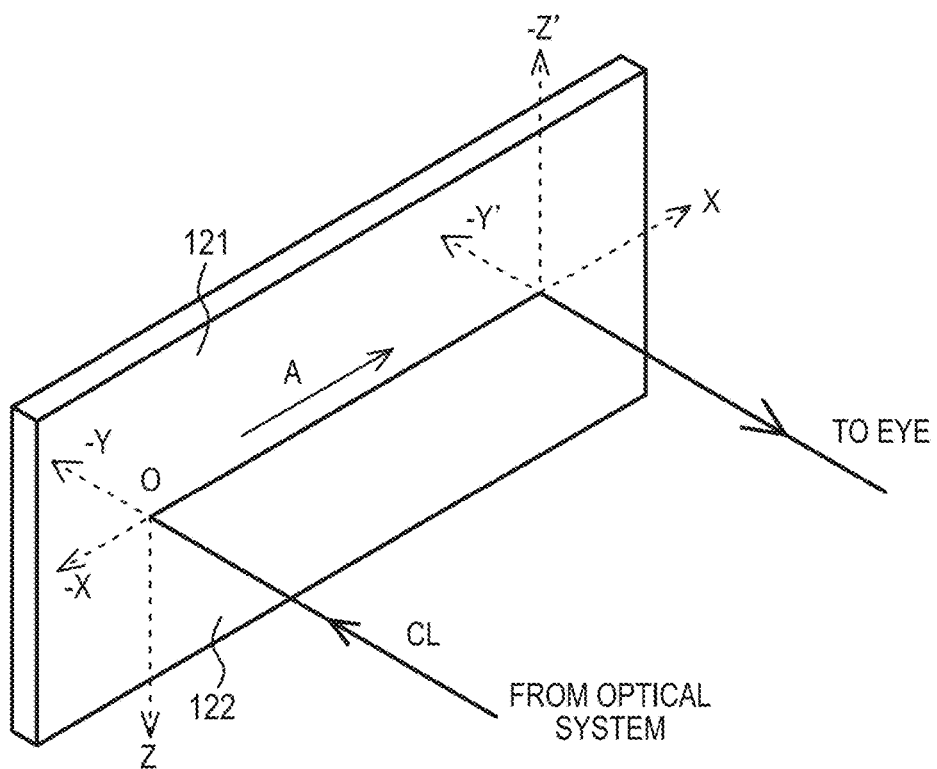
FIGS. 14A and 14B are views schematically showing the propagation of light in a light guide plate that forms the image display apparatus in the related art, and conceptual diagrams showing an arrangement state of a light guide plate, etc. that forms an image display apparatus in the related art.
Figure 14B:
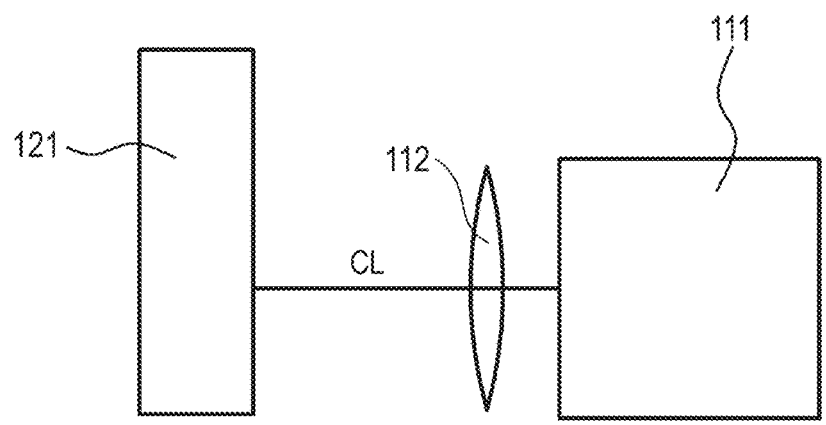

Example 6 is a modification of Examples 1 to 5, and relates to a head mounted display according to a second embodiment of the invention. A view when a state where the image display apparatus of Example 6 is worn on the head of an observer is obliquely viewed is shown in FIG. 9, a view when the image display apparatus is viewed from the front is shown in FIG. 10, a view when the image display apparatus is viewed from the side is shown in FIG. 11, and a view when the image display apparatus is viewed from above is shown in FIG. 12. Although these drawings show that the image display apparatus is worn on the head of an observer, they shows a state before the image display apparatus pivots downward with respect to the frame, with a virtual straight line connecting the centers of two eyeballs of the observer who observes the image display apparatus as a pivot axis.

Similarly to those described in Examples 1 to 5, the head mounted display of Example 6 includes (a) a frame shaped like glasses 50 to be worn on the head of an observer, and (b) an image display apparatus 100, 200, 300, or 400 attached to the frame 50, and the image display apparatus 100, 200, 300, or 400 includes:

(A) an image forming device 111 or 211;

(B) an optical system (a parallel light emitting optical system) 112 or 254 which converts the light emitted from the image forming device 111 or 211 into parallel light, and (C) an optical device 120 or 320 which the light beams converted into the parallel light by the optical system 112 or 254 enter, and are guided therein, and emitted therefrom.

The image display apparatus 100, 200, 300, or 400 is pivotally attached to the frame 50, with a virtual straight line connecting the centers of two eyeballs of the observer who observes the image display apparatus 100, 200, 300, or 400 as a pivot axis RX. Specifically, in the head mounted display of Example 6, at least one of the image forming device 111 or 211, the optical system 112 or 254, and the optical device 120 or 320 (more specifically, the image forming device 111 or 211, the optical system 112 or 254, and the optical device 120 or 320 are integrated, and generally all of these) is pivotally attached to the frame 50. In the head mounted display of Example 6, when an observer views a horizontally located object, a central light beam that is emitted from the optical device and enters the eyes of the observer forms a depression angle, and the depression angle with respect to the horizontal plane is, for example, 5 degrees to 45 degrees.

In the head mounted display of Example 6, the frame 50 is formed by a front portion 51 arranged at the front of an observer, and two temple portions 53 attached to both ends of the front portion 51 in a fixed state. A tip portion of each temple portion 53 is formed by a U-shaped member. In the following description, a tip portion of the temple portion 53 equivalent to a U-shaped upper crossbar is referred to as a "first member 53A", a tip portion of the temple portion 53 equivalent to a U-shaped lower crossbar is referred to as a "second member 53B", and a tip portion of the temple portion 53 equivalent to a U-shaped longitudinal bar is referred to as a "third member 53C". The second member 53B is attached to both ends of the front portion 51 in a fixed state. An arm portion (handle portion) 53D further extends toward an end cover portion 54 from the third member 53C. Two end cover portions 54 are connected together by a holding band 55 to prevent the head mounted display from shifting when the head mounted display is worn on a head. Such a mounting band can be incorporated even in Examples 1 to 5.

The image forming device 111 or 211 is stored in the space that is sandwiched between the first member 53A and the second member 53B, and is surrounded by the first member 53A, the second member 53B, and third member 53C. Specifically, a recessed portion (not shown) is provided in the image forming device 111 or 211 that faces the first member 53A, and the face of the first member 53A that faces the image forming device 111 or 211 is provided with a projection portion (not shown) that fits the recessed portion. Further, the image forming device 111 or 211 that faces the second member 53B is provided with a threaded hole portion (not shown), and the second member 53B that faces the image forming device 111 or 211 is provided with a through hole. Then, the image forming device 111 or 211 can be attached to the tip portion of the temple portion 53 by fitting the recessed portion provided in the image forming device 111 or 211 to the projection portion provided in the first member 53A, passing a screw (the head of a screw 56 is shown in FIG. 11 only) through the through hole provided in the second member 53B, and screwing the screw 56 into the hole portion provided in the image forming device 111 or 211. From the viewpoint of reliably attaching the image forming device 111 or 211 to the tip portion of the temple portion 53, it is preferable that a push spring be inserted into a shank of the screw 56 between the head of the screw 56 and the image forming device 111 or 211. A straight line connecting the projection portion provided in the first member 53A and the screw 56, and a virtual straight line connecting the centers of two eyeballs of an observer are located on the pivot axis RX. The image display apparatus 100, 200, 300, or 400 can be pivotally attached to the frame 50, with the virtual straight line connecting the centers of two eyeballs of the observer as the pivot axis RX. In addition, the attaching mechanism and attaching method of the image display apparatus 100, 200, 300, and 400 described above are merely illustrative, and can be suitably altered. Even if a straight line connecting the projection portion provided in the first member 53A and the screw 56, and the virtual straight line connecting the centers of two eyeballs of an observer are slightly shifted from each other, i.e., when the distance between the virtual straight line connecting the centers of two eyeballs of the observer, and the pivot axis RX is a maximum of 6.5 mm, there is no case where an image emitted from the image display apparatus 100, 200, 300, or 400 is substantially moved away from the eyes of the observer. Thus, it is assumed that the image display apparatus 100, 200, 300, or 400 is pivotally attached to the frame 50, with a virtual straight line connecting the centers of two eyeballs of an observer who observes an image display apparatus as a pivot axis.

Since the image display apparatus and the light guide plate in Example 6 can have the same configuration and structure as the image display apparatus and the light guide plate which are described in Examples 1 to 5, a detailed description thereof is omitted.

Since the image display apparatus 100, 200, 300, or 400 that forms the head mounted display of Example 6 is pivotally attached to the frame 50, with a virtual straight line connecting the centers of two eyeballs of the observer who observes the image display apparatus as a pivot axis RX, even when the image display apparatus 100, 200, 300, or 400 is moved in a vertical direction by pivoting the image display apparatus 100, 200, 300, or 400, there is no case where an image emitted from the image display apparatus 100, 200, 300, or 400 is moved away from the eyes of an observer.

In addition, even when it is unnecessary to display a display image while being shifted to a position above or below a horizontal line of sight of an observer, when it is necessary to pivot the image display apparatus to move the image display apparatus in the vertical direction, thereby optimizing the position of the image display apparatus, the mechanism, configuration, and structure which allows the central light beam to intersect the XY plane at angles (θ) other than 0 degree as described in Examples 1 to 5 are unnecessary. The image display apparatus has only to be pivotally attached to the frame, with a virtual straight line connecting the centers of two eyeballs of an observer who observes the image display apparatus as a pivot axis.

Although the invention has been described above on the basis of the preferable embodiments, the invention is not limited to these embodiments. The configuration and structure of the image display apparatus and the head mounted display that have been described in the embodiments are merely illustrative, and can be suitably altered. For example, a surface relief-type hologram (refer to US Patent Application Publication 2004/0062505A1) may be arranged in the light guide plate. The optical device 320 of Example 3 or 4, can also be embodied so that the diffraction grating element is formed by a transmissive diffraction grating element, or any one of the first deflecting member and the second deflecting member is formed by a reflective diffraction grating element, and the other is formed by a transmissive diffraction grating element. Alternatively, a reflective blazed diffraction grating element can also be used as the diffraction grating element.

It should be understood by those skilled in the art that various modifications, combinations, sub-combinations and alterations may occur depending on design requirements and other factors insofar as they are within the scope of the appended claims or the equivalents thereof.

What is claimed is:

1. An image display apparatus comprising:
an image forming device configured to emit light; and
an optical device including:
(a) a light guide plate from which incident light is emitted after the light propagates in the light guide plate by total reflection;
(b) a first deflector configured to deflect the incident light so that the incident light is totally reflected in the light guide plate; and
(c) a second deflector configured to deflect the light propagated in the light guide plate;
wherein when a central light beam that is emitted from the center of the image forming device enters a first point of the optical device and exits from a second point of the optical device, an axis that passes through the first point and the second point is defined as a first axis, and an axis that passes through the first point, and coincides with the normal axis of the optical device is defined as a second axis, and
the central light beam intersects a plane configured with the first axis and second axis at angles other than 0 degree.

2. The image display apparatus according to claim 1, wherein the first axis extends in an X-axis direction, the second axis extends in a Y-axis direction, and a Z-axis direction is perpendicular to the X-axis direction and the Y-axis direction.

3. The image display apparatus according to claim 2, wherein the central light beam is included in the YZ plane.

4. The image display apparatus according to claim 2, wherein the optical axis of the optical system is included in the YZ plane and intersects the XY plane at angles other than 0 degree.

5. The image display apparatus according to claim 2, wherein the optical axis of the optical system is parallel to the YZ plane, is parallel to the XY plane, and passes through a position shifted from the center of the image forming device.

6. The image display apparatus according to claim 1, wherein the image display apparatus is configured to be pivotally attached to a frame shaped like glasses wearable on the head of an observer, with a virtual straight line connecting the centers of two eyeballs of the observer as a pivot axis.

7. The image display apparatus according to claim 6, wherein at least one of the image forming device and the optical device is pivotally attached to the frame.

8. The image display apparatus according to claim 1, wherein when an observer views a horizontally located object, a central light beam that is emitted from the optical device and enters the eyes of the observer forms a depression angle.

9. The image display apparatus according to claim 7, wherein the frame is formed by a front portion arranged at the front of the observer, and two temple portions pivotally attached to both ends of the front portion via hinges.

10. A head mounted display comprising the image display apparatus according to claim 1.

11. The head mounted display according to claim 10, further comprising a frame shaped like glasses wearable on the head of an observer, wherein the image display apparatus is configured to be pivotally attached to the frame, with a virtual straight line connecting the centers of two eyeballs of the observer as a pivot axis.

12. The head mounted display according to claim 11, wherein at least one of the image forming device and the optical device is pivotally attached to the frame.

13. The head mounted display according to claim 12, wherein the frame is formed by a front portion arranged at the front of the observer, and two temple portions pivotally attached to both ends of the front portion via hinges.

14. The head mounted display according to claim 10, wherein when an observer views a horizontally located object, a central light beam that is emitted from the optical device and enters the eyes of the observer forms a depression angle.

* * * * *